(12) United States Patent
Meshcheryakov et al.

(10) Patent No.: US 10,734,674 B2
(45) Date of Patent: Aug. 4, 2020

(54) SOLID-STATE THIN FILM HYBRID ELECTROCHEMICAL CELL

(71) Applicant: THINIKA, LLC, Ulyanovsk (RU)

(72) Inventors: Vladimir Igorevich Meshcheryakov, Ozyory (RU); Arnoux Rossouw, Dubna (RU); Anton Mikhailovich Manakhov, Ivanovo (RU); Nikolay Anatolievich Pogorelov, Ulyanovsk (RU); Elana Viktorovna Kolesnikova, Aleksandrov (RU); Vladimir Aleksandrovich Chugunov, Ulyanovsk (RU)

(73) Assignee: Thinika, LLC, Ulyanovsk (RU)

( * ) Notice: Subject to any disclaimer, the term of this patent is extended or adjusted under 35 U.S.C. 154(b) by 102 days.

(21) Appl. No.: 16/101,602

(22) Filed: Aug. 13, 2018

(65) Prior Publication Data
US 2019/0051936 A1    Feb. 14, 2019

Related U.S. Application Data

(60) Provisional application No. 62/544,998, filed on Aug. 14, 2017.

(51) Int. Cl.
*H01M 10/056* (2010.01)
*H01M 10/0562* (2010.01)
(Continued)

(52) U.S. Cl.
CPC ........ *H01M 10/0562* (2013.01); *H01G 11/06* (2013.01); *H01G 11/46* (2013.01);
(Continued)

(58) Field of Classification Search
CPC ... H01M 10/0562; H01G 11/06; H01G 11/46; H01G 11/56; H01G 11/68; H01G 11/84
(Continued)

(56) References Cited

U.S. PATENT DOCUMENTS

2003/0026063 A1    2/2003    Munshi
2004/0005265 A1*   1/2004    Chiang ............... H01M 4/5825
                                                        423/306
(Continued)

FOREIGN PATENT DOCUMENTS

CN    106449167 A    2/2017
CN    106835042 A    6/2017
(Continued)

OTHER PUBLICATIONS

Search Report in RU 2018129569.
Search Report in PCT/RU2018/050098, dated Jan. 24, 2019.

*Primary Examiner* — Amanda C. Walke
(74) *Attorney, Agent, or Firm* — Bardmesser Law Group

(57) ABSTRACT

Thin film all-solid-state power sources, including pseudo-capacitors having solid inorganic $Li^+$-ion conductive electrolyte, for IoT, microsensors, MEMS, RFID TAGs, medical devices, elements of microfluidic chips Micro Electro Harvesting and ultra-light energy storage. An electrochemical power source includes a substrate; a first current collector layer on the substrate; a first buffer/cache layer on the first current collector layer; a solid-state electrolyte layer on the first buffer/cache layer; a second buffer/cache layer on the solid-state electrolyte layer; a second current collector layer on the second buffer/cache layer. Each buffer/cache layer is formed of $Li_xM_yO_3$, where M is Nb, Ta, Ti, V, X is 0.8-1.4, and Y is 1.2-0.6. The buffer/cache layer is 15-1000 nm. At least one Faradaic layer is between the first collector layer and the first buffer layer and/or between the second collector layer and the second buffer layer.

20 Claims, 13 Drawing Sheets

(51) Int. Cl.
  *H01M 10/0525* (2010.01)
  *H01M 10/058* (2010.01)
  *H01M 4/36* (2006.01)
  *H01G 11/84* (2013.01)
  *H01G 11/06* (2013.01)
  *H01G 11/56* (2013.01)
  *H01G 11/46* (2013.01)
  *H01G 11/68* (2013.01)
  *H01M 4/66* (2006.01)
  *H01M 6/40* (2006.01)
  *H01M 4/485* (2010.01)
  *H01M 10/0585* (2010.01)

(52) U.S. Cl.
  CPC ............. *H01G 11/56* (2013.01); *H01G 11/68* (2013.01); *H01G 11/84* (2013.01); *H01M 4/36* (2013.01); *H01M 4/485* (2013.01); *H01M 4/661* (2013.01); *H01M 6/40* (2013.01); *H01M 10/058* (2013.01); *H01M 10/0525* (2013.01); *H01M 10/0585* (2013.01)

(58) Field of Classification Search
  USPC ........................................................ 429/304
  See application file for complete search history.

(56) References Cited

U.S. PATENT DOCUMENTS

| | | | |
|---|---|---|---|
| 2006/0292444 A1* | 12/2006 | Chiang | H01M 4/134 429/218.1 |
| 2014/0227606 A1 | 8/2014 | Suzuki et al. | |
| 2015/0084157 A1* | 3/2015 | Tegen | H01L 21/822 257/528 |
| 2016/0293947 A1* | 10/2016 | Tamura | C01G 23/00 |
| 2016/0336622 A1* | 11/2016 | Zhang | H01M 4/48 |
| 2017/0084401 A1 | 3/2017 | Xing | |
| 2019/0245247 A1* | 8/2019 | Libsch | H01G 11/86 |

FOREIGN PATENT DOCUMENTS

| | | | | |
|---|---|---|---|---|
| JP | 2017117803 A | 6/2017 | | |
| RU | 2624466 C1 | 7/2017 | | |
| WO | 2015185129 A1 | 10/2015 | | |
| WO | 2015/185129 A1 | 12/2015 | | |
| WO | WO-2019163931 A1 * | 8/2019 | ............. | H01M 4/48 |

* cited by examiner

SOLID-STATE THIN FILM HYBRID ELECTROCHEMICAL CELL

CROSS-REFERENCE TO RELATED APPLICATIONS

This application claims priority to U.S. Provisional Application No. 62/544,998, filed on Aug. 14, 2017, which is incorporated herein by reference in its entirety.

BACKGROUND OF THE INVENTION

Field of the Invention

The invention relates to thin film all-solid-state power sources, and, in particular, to thin film pseudocapacitors having solid inorganic $Li^+$-ion electrolyte, intended for microelectronic devices (including micro sensors, micro electromechanical systems, microfluidic chips, RFID tags), various micro-electric harvesting solutions and ultra-light energy storage devices, medical devices and integrated solutions, such as monochip and lab-on-chip solutions.

Background of the Related Art

Miniaturization of electronic devices and reducing their power consumption require emerging sub-compact power sources suitable for direct embedding into microelectronic devices. Li-ion batteries and supercapacitors (i.e., electric double-layer capacitors (EDLC) or ionistors) have become wide-spread embedded secondary power sources. First generation of Li-ion batteries and ionistors was based on a liquid electrolyte, which caused a number of significant disadvantages, such as severe limitation on operational temperature, distinct parameter drift even in a limited temperature range, mediocre performance, fast performance degradation over time under severe operation conditions, risk of electrolyte leakage, and risk of de-capsulation (sometimes resulting in an explosive event).

Attempting to overcome the above-mentioned disadvantages were Li-ion batteries and supercapacitors having a gel-like electrolyte, a polymeric electrolyte and, further, an inorganic solid electrolyte. Technology convergence of solid-state Li-ion batteries and supercapacitors brought hybrid power sources, which combine features of both Li-ion batteries and supercapacitors and have improved performance and extended operational temperature range.

On the one hand, various solid-state electrochemical power sources were developed during previous decades. Mostly, they are implemented as thin-film Li-ion batteries based on known operational concepts and known materials. On the other hand, to the best knowledge of the inventors, the market does not offer any commercially available all-solid-state power sources such as supercapacitors, pseudo-capacitors or hybrid capacitors with true inorganic solid-state electrolyte having acceptable performance.

Thin Film Solid-State Batteries

Thin film solid-state Li-ion batteries (TF-SS-LIB) were developed and manufactured by many companies during the last 15 years. Mostly, materials and processes used for their production are substantially the same as for typical pouch Li-ion batteries (see FIG. 1).

TF-SS-LIBs are usually manufactured using substrates like $Si/SiO_2$, Sapphire, PET, PEN, KAPTON, etc. The battery stack layers may be built by a variety of physical vapor deposition (PVD) and/or chemical vapor deposition (CVD) methods, as well as using a sol-gel, pressing or printing technology.

As anodic materials, Li-based materials (Li metal or alloys) [1], carbon-based materials (graphite, activated carbon, carbon nanotubes and graphene), variety of composite and alloyed materials, as well as metal oxides, $Li_4Ti_5O_{12}$ (LTO), nitrides, oxinitrides, etc. are often used.

Cathodic materials are also based on "classical" materials, such as $LiCoO_2$ (LCO), $LiMn_2O_4$, $LiFePO_4$, $LiV_3O_8$, or their combinations with other metal oxide dopants. Usually, specific capacity of such materials is in the range of 100-350 mAh/g and their potential is about 2.5-4.2 V relative to $Li/Li^+$ [2].

Solid-state electrolyte is $Li_{2.2\text{-}3.5}PO_{2.0\text{-}3.5}N_{0.3\text{-}0.9}$ (LI-PON) in the overwhelming majority of all battery solutions. But in some cases, such electrolytes as $Li_7La_3Zr_2O_{12}$ (LLZO), $Li_{1.5}Al_{0.5}Ti_{1.5}(PO_4)_3$(LATP), $Li_{0.29}La_{0.5}TiO_3$ (LLT), $Li_5La_3Ta_2O_{12}$ (LLTO), $Li_{14}ZnGe_4O_{16}$ (LISICON), $Li_9SiAlO_8$, $Li_3N$, $Li_{1.5}Al_{0.5}Ge_{1.5}(PO_4)_3$(NASICON type), etc. can be used. It has been noted that in some devices electrolytes based on organic-inorganic gel like (PEO, PVB, PVP)-$LiClO_4$, $LiBF_4$, $LiPF_6$, $LiCF_3SO_3$, etc. may be used, since conventional solid-state electrolytes have low $Li^+$ ion conductivity. Their conductivity is usually in the range of $10^{-6}$-$10^{-5}$ S·cm$^{-1}$ and only in rare cases it may reach $10^{-3}$ S·cm$^{-1}$ and even $10^{-2}$ S·cm$^{-1}$. Gel-type electrolyte usually provides a more stable higher conductivity of $10^{-4}$-$10^{-2}$ S·cm$^{-1}$.

All-solid-state batteries manufactured according to this approach provide a voltage of about 3.0-4.1 V and have specific energy in the range of 100-400 Wh/kg (usually this parameter is calculated using only the material of active layers, no substrate and package material is taken into account). They are able to operate in a moderately wide temperature range of −20 to +65° C. (a range of −20 to +85° C. or −40 to +150° C. is sometimes claimed), and may have an area of 0.5 cm$^2$ to 12.5 cm$^2$ or even more. Thickness of active layer stack in such batteries is about 5-20 µm including current collectors, but thickness of the final device depends on substrate thickness and protection material thickness and may be about 170-1000 µm or even more. When talking about specific energy, the weight of a final device needs to be considered, and it has to be kept in mind that actual specific energy of a final device may be substantially less than specified for the active materials. Actually, in thin film devices, the weight of substrate may be over 95% of total weight. In pouch batteries, the specific energy depends on the battery size. If the battery size is substantial, then the specific energy of devices is closer to the specific energy of its active materials. This happens because weight of the package, frame and current collectors is much less than weight of the active materials in such batteries. This is why a direct comparison of specific energy or power density of thin-film devices and pouch devices is not always correct.

Advantages of Li-ion thin film solid-state batteries are well-known. They have a higher operating voltage (3.2-3.9 V), a high continuous current and a moderately high discharge rate (FIG. 2) [3].

About 90% of capacity of a Li-ion solid-state battery is provided in a flat region of its discharge curve and its operational output voltage is high enough to feed various microelectronic chips directly, since most of them are operable at a power source voltage of over 1.5 V.

At the same time Li-ion batteries have a number of disadvantages:

(A) Low charge rate. In theory, in most cases, the charge and discharge rates could be quite high (over 5-10 C), but they are not normal operating values and have to be limited intentionally, to avoid possible damage and shorting lifetime of the battery.

(B) Limited cut-off voltage. For example, LCO-based Li-ion batteries should not be discharged below 3.0 V. Discharging them below the cut-off voltage may result in their damage. The battery also should not be short circuited, and they are unable to maintain their operability after discharge to 0 V.

(C) Sensitivity to the charging voltage. The batteries may be safety charged in a very narrow voltage region. For example, a battery having a nominal voltage of 3.9 V may be charged at 4.10-4.15 V by constant current only. Overvoltage may damage the battery. It is preferable to control charge/discharge process by an additional precise microelectronics controller, which is quite expensive in comparison to the battery itself.

(D) Unsatisfactory operating temperature range. Some battery producers claim operational range of −40 to +150° C., which is quite ambitious. In fact, some objective limitations have to be kept in mind. First, at a very low temperature (−40 to −20° C.) only a discharge process is possible. Charging process is usually possible only at a temperature above −20° C., and even above 0° C. in most cases. The claimed upper operational temperature may be quite high, but a safe operational temperature cannot exceed the maximum storage temperature of +50 to +60° C. Electrochemical degradation rises exponentially as the temperature increases. In other words, a battery may work at elevated temperatures +85 to +100° C. only for a short period, as irreversible degradation and capacity loss is caused by overheating. In addition, producers use lithium metal as anode material to increase specific power in most batteries. Metallic lithium has a melting point of 180.5° C., and it reacts vigorously with atmospheric gases and moisture even at an ambient temperature. Metallic lithium reacts explosively with atmospheric nitrogen at 160° C. In other words, such batteries should not be handled as power sources at a temperature higher than +150° C. In fact, their safe operational temperature is in the range of 0 to +60° C.

In addition, thin film solid-state lithium-ion batteries have a very high specific ESR value of about 30-100 Ohm/cm$^2$, which means approximately 100-300 Ohm and higher for ESR of a finished device. For comparison, ESR of a standard 2032 coin cell is about 20-30 Ohm, which is much lower than of thin film solid-state devices available on the market.

Thus, existing thin film solid-state lithium-ion batteries (a) are not able to provide high current; (b) shall not be connected in series for assembling a higher voltage battery, as general internal resistance of such a battery would be very high, so the battery would not be able to output a necessary power; (c) have low charge rate.

Taking into consideration the above-mentioned disadvantages, it would be logical to focus on such devices as supercapacitors, pseudocapacitors (or hybrid capacitors). However, for now, there are very few developments in the field of solid-state devices, and they basically do not match even those parameters as their counterparts with liquid electrolyte have.

Thin Film Semi-Solid-State Electric Double Layer Capacitors and Pseudocapacitors An electric double layer capacitor (EDLC) is an electrical energy storage device that physically stores energy by forming an electric double layer consisting of adsorbed layers of cations and anions at interfaces between electrodes and electrolyte [4]. The main problem of such type of devices relates to low ionic conductivity of the electrolyte. It is important to have conductivity more than $10^{-2}$ S·cm$^{-1}$ to get an operable EDLC or pseudocapacitor. Some researchers call their supercapacitors "flexible solid state" or even "solid-state", but actually they use either gel or polymeric/gelled ionic liquid electrolytes instead of true inorganic solid-state electrolytes. It is important to avoid this misunderstanding. The electrolytes they use are mostly based on a mixture of common inorganic lithium salts, such as $LiClO_4$, $LiPF_6$, $LiCF_3SO_3$, $LiBF_4$, and appropriate polymers based on PEO, PVP, PVB, PVA, PMMA, etc. [1]-[8]. These types of supercapacitors have the same charge/discharge behavior as usual wet supercapacitors (EDLC or pseudocapacitors) (FIGS. 3A-3B).

Pseudocapacitors (including Li$^+$ ion hybrid capacitors) have higher capacity due to involving pseudocapacity of one or two electrodes and may have some flat discharge region, but they have less power and lifetime than "classical" EDLC.

Semi-solid supercapacitors may have carbon or metal oxide or metal oxinitride electrodes as well as composite electrodes. The materials of electrodes are substantially the same as for classical wet supercapacitors. They also may have asymmetrical and symmetrical structure (FIGS. 4A-4B).

Accordingly, they have substantially the same limitations as "classic" wet supercapacitors.

(A) Low cell voltage (in most cases it is even lower than in wet supercapacitors with organic solvent). This obstacle relates to a higher IR drop or to slower charge transfer between electrode and electrolyte.

(B) Low useful capacity per cell. It shall be noted that due to linear discharge, EDLC only delivers 44% of the stored energy in the useful output voltage range; the remaining 56% is reserved. This situation is somewhat better for pseudocapacitors (FIGS. 3A-3B), but still far from acceptable.

(C) Moderately low upper limit of working temperature range (−40 to +65° C. or −40 to +85° C.). Mostly, it would be expected to be higher than in TF-SS-LIBs and would be even slightly higher than in supercapacitors with liquid electrolyte. However, the inventors are not aware of such commercial devices on the market with datasheets that can be trusted. Actual temperature range may be far narrower.

(D) Limited lifetime. The lifetime usually does not exceed 10,000 cycles, which is much less than for common EDLC and pseudocapacitors with liquid electrolyte (100,000-1,000,000 cycles).

Thin Film Solid-State Polymeric Supercapacitors

Another type of redox electrode materials for use in supercapacitors is electronically conducting polymers. Similar to transition metal oxides, conducting polymers are able to boost capacitance as they are redox-active and capable of utilizing fast and reversible electron transfer or Faradic reactions for storing charge within the electrode. Pseudocapacitors based on conducting polymers may be produced as flexible devices with gel or polymer electrolyte or even by pressing with dry lithium conducting membranes of NAFION type. Although a semiconducting polymer itself possesses some capacitive properties, it often performs below expectation when used alone without any morphology control or hybridization with another material. For example, pure PEDOT could show a rectangular shape cyclic voltammetry at 200 mV/s scan rate, but a symmetrical PEDOT supercapacitor offers an actual specific energy of 1-4 Wh/kg, while the goal was set to be 15 Wh/kg almost twenty years ago [16]. In recent years, developments have been focused on combining CNTs, graphene or other skeleton materials with conducting polymers [17]. This may be an effective approach for overcoming drawbacks of conducting polymers in mechanical strength and conductivity, while maintaining their large pseudocapacity.

However, as of today, such systems have the following disadvantages.

(A) Short lifetime. As a rule, cycling does not go beyond of several thousand cycles.

(B) Narrow range of operational temperature.

(C) Relatively low specific energy. This limitation is expected to be overcome in the future.

(D) Limited storage time due to aging effects in polymeric systems.

(E) Limited voltage of cells due to relatively small size of electrochemical window of polymeric materials used in the composition.

Generally, prospects for development of polymer and composite solid-state supercapacitors are rather promising. Even now, the existing prototypes have enough capacity and stored energy. However, they still need more improvements in view of temperature and lifetime problems.

Thin Film all-Solid-State Supercapacitors and Pseudocapacitors

The first true all-solid-state thin film supercapacitors (pseudocapacitors) have been implemented as $RuO_2$/LI-PON/$RuO_2$ symmetrical devices [13]. These devices provide open circuit voltage of about 2.5 V, but have very high IR drop and their terminal voltage is less than 1.0 V in most area of discharging curve (FIG. 5).

These devices may be either of asymmetrical or symmetrical structure (FIGS. 9A-9B) and may be implemented using transition metal oxides having high electrical conductivity like $RuO_2$, $IrO_2$, $ReO_3$, $MnO_2$, $Co_3O_4$, NiO, $CeO_2$, $MoO_2$, $Ta_2O_5$, $WO_3$, etc. The metal oxides to be used for the electrodes must also have intrinsic or extrinsic (artificial) pseudocapacity for ions (particularly $Li^+$ ions). Usually, they either have chemisorption properties or may be reversibly oxidized with quite high reaction rate. Generally, their redox processes may be very similar to those of the battery electrode materials. That is why they tend to have higher capacity than EDLC capacitors. However, to the best of the inventor's knowledge, there are no any commercial true all-solid-state supercapacitor devices on the market yet.

Since operational principles of such devices are very close to those of the all-solid-state Li-ion batteries, the same solid-state electrolytes may be used for them. The most abundant solid-state electrolytes are perovskite-type (LLTO, LLTON), garnet-type (LLZO, LLZTO, LLBTO), NASICON-related, LISICON-type and LIPON [14]. All-solid-state supercapacitors would have a number of advantages: absence of liquid electrolytes, inorganic layers structure with high durability, wide voltage window, wide temperature range, high capacity, extra-long cycle life, etc. Unfortunately, they lose such advantages due to very low conductivity of solid-state electrolytes. Mostly the conductivity is about $10^{-8}$-$10^{-6}$ S·$cm^{-1}$ and only in rare cases it may be slightly higher (in some papers, a conductivity of $10^{-5}$-$10^{-2}$ S·$cm^{-1}$ has been reported). The amount of mobile $Li^+$ ions in solid-state electrolytes is also low and may be about 0.4-4.0% of all the ions of $Li^+$ in the electrolyte matrix [15]. Furthermore, the $Li^+$ ion conductivity of solid-state electrolytes strongly depends on the operational temperature. It drops down at low temperature by 2 to 6 orders of magnitude or even lower (FIG. 7).

All these factors lead to slow operation of a solid state device and to rather poor characteristics in comparison with wet supercapacitors. In addition, some of $Li^+$ ions might not be de-intercalated from the metal oxide electrode during discharge process due to fast electron current sweep, which forms an ionic repulsion against the charged $Li^+$ ions during charge process. That is, the IR drop and capacity degradation may originate from the lower ion mobility of $Li^+$ ions in a solid-state electrolyte than ion mobility of $Li^+$, $H^+$ and $OH^-$ in a liquid electrolyte.

Though the inventors are not aware of any commercially produced solid-state supercapacitors, such devices would be expected to have the following disadvantages.

(A) Low open circuit voltage and terminal voltage per cell (usually it is less 1.0 V).

(B) Low power characteristics due to low $Li^+$ ion mobility and low percentage of mobile $Li^+$.

(C) High internal resistance (ESR).

(D) Narrow operational temperature range (due to strong solid-state electrolyte temperature conductivity dependence) (FIG. 7).

(E) High leakage current (due to non-zero electron conductivity of solid electrolytes).

(F) Short lifetime due to (a) ineffective $Li^+$ ion deintercalation processes and (b) shrinkage and delamination processes during cycling.

A lot of efforts have been made in the art recently to avoid these and some other limitations, as may be seen from related patent documents.

US Patent Publication No. 20070184345A1 discloses a hybrid accumulator (battery) having a Li-containing solid electrolyte, which may be produced using a thin film technology based on magnetron sputtering or a similar approach.

US Patent Publication No. 20080102363A1 discloses an accumulator (battery) having a Li-containing solid electrolyte, which may be produced using a thin film technology.

US Patent Publication No. 20090098281A1 discloses an accumulator (battery) having a Li-containing solid electrolyte, which may be produced using a thin film technology based on magnetron sputtering or a similar approach.

US Patent Publication No. 20100190051A1 discloses an accumulator (battery) having a Li-containing solid electrolyte, which may be produced using a thin film technology based on magnetron sputtering or a similar approach.

US Patent Publication No. 20100261067A1 discloses a method of manufacturing a homogeneous thin film Li-containing electrolyte for double-layer capacitors.

US Patent Publication No. 20110070503A1 discloses an accumulator (battery) having a Li-containing solid electrolyte, which may be produced using a thin film technology based on magnetron sputtering or a similar approach.

US Patent Publication No. 20110076568A1 discloses an accumulator (battery) having a Li-containing solid electrolyte, which may be produced using a thin film technology.

US Patent Publication No. 20110117417A1 discloses an accumulator (battery) having a Li-containing solid electrolyte, which may be produced using a thin film technology.

US Patent Publication No. 20110151283A1 discloses an accumulator (battery) having a Li-containing solid electrolyte, which may be produced using a thin film technology based on magnetron sputtering or a similar approach.

US Patent Publication No. 20110274974A1 discloses an accumulator (battery) having a Li-containing solid electrolyte, which may be produced using a thin film technology.

US Patent Publication No. 20110281167A1 discloses an accumulator (battery) having a Li-containing solid electrolyte, which may be produced using a thin film technology based on magnetron sputtering or a similar approach.

US Patent Publication No. 20110287296A1 discloses an accumulator (battery) having a Li-containing solid electrolyte, which may be produced using a thin film technology based on magnetron sputtering or a similar approach.

US Patent Publication No. 20110318652A1 discloses an accumulator (battery) having a Li-containing solid electrolyte, which may be produced using a thin film technology based on magnetron sputtering or a similar approach.

US Patent Publication No. 20120028129A1 discloses an accumulator (battery) having a Li-containing solid electrolyte, which may be produced using a thin film technology based on magnetron sputtering or a similar approach.

US Patent Publication No. 20120164517A1 discloses an accumulator (battery) having a Li-containing solid electrolyte, which may be produced using a thin film technology based on magnetron sputtering or a similar approach.

US Patent Publication No. 20120214064A1 discloses an accumulator (battery) having a Li-containing solid electrolyte, which may be produced using a thin film technology.

US Patent Publication No. 20120237835A1 discloses an accumulator (battery) having a Li-containing solid electrolyte, which may be produced using a thin film technology, and a method of manufacturing such an electrolyte.

US Patent Publication No. 20120318664A1 discloses a method of manufacturing of a zero-defect thin film Li-containing electrolyte for electrochemical power sources.

US Patent Publication No. 20130022878A1 discloses an accumulator (battery) having a Li-containing solid electrolyte, which may be produced using a thin film technology, and a method of manufacturing such an electrolyte.

US Patent Publication No. 20130071756A1 discloses an accumulator (battery) having a Li-containing solid electrolyte, which may be produced using a thin film technology, and a method of manufacturing such an electrolyte.

Patent publication WO2016080912A1 discloses an accumulator (battery) having a Li-containing solid electrolyte, which may be produced using a thin film technology, and a method of manufacturing such an electrolyte.

US Patent Publication No. 20130249054A1 discloses an accumulator (battery) having a Li-containing solid electrolyte, which may be produced using a thin film technology based on magnetron sputtering or a similar approach.

US Patent Publication No. 20130252064A1 discloses an accumulator (battery) having a Li-containing solid electrolyte, which may be produced using a thin film technology based on magnetron sputtering or a similar approach.

US Patent Publication No. 20130252088A1 discloses an accumulator (battery) having a Li-containing solid electrolyte, which may be produced using a thin film technology based on magnetron sputtering or a similar approach.

US Patent Publication No. 20130252089A1 discloses an accumulator (battery) having a Li-containing solid electrolyte, which may be produced using a thin film technology based on magnetron sputtering or a similar approach.

US Patent Publication No. 20130280581A1 discloses an accumulator (battery) having a Li-containing solid electrolyte, which may be produced using a thin film technology based on magnetron sputtering or a similar approach.

US Patent Publication No. 20130309568A1 discloses an accumulator (battery) having a Li-containing solid electrolyte, which may be produced using a thin film technology based on magnetron sputtering or a similar approach.

US Patent Publication No. 20140013588A1 discloses an accumulator (battery) having a Li-containing solid electrolyte, which may be produced using a thin film technology.

US Patent Publication No. 20140099541A1 discloses an accumulator (battery) having a Li-containing solid electrolyte, which may be produced using a thin film technology based on magnetron sputtering or a similar approach, and a method of manufacturing an anode active substance.

US Patent Publication No. 20160329603A1 discloses an accumulator (battery) having a Li-containing solid electrolyte, which may be produced using a thin film technology.

Patent publication WO2000060682A1 discloses an accumulator (battery) having a Li-containing solid electrolyte, which may be produced using a thin film technology based on magnetron sputtering or a similar approach.

Patent publication WO2003043108A1 discloses an accumulator (battery) having a Li-containing solid electrolyte, which may be produced using a thin film technology based on magnetron sputtering or a similar approach.

Patent publication WO2007061928A3 discloses an accumulator (battery) having a Li-containing solid electrolyte, which may be produced using a thin film technology based on magnetron sputtering or a similar approach.

Patent publication WO2011014970A2 discloses an accumulator (battery) having a Li-containing solid electrolyte, which may be produced using a thin film technology based on magnetron sputtering or a similar approach.

Patent publication WO2011066518A1 discloses an accumulator (battery) having a Li-containing solid electrolyte, which may be produced using a thin film technology.

Patent publication WO2014116522A1 discloses an accumulator (battery) having a Li-containing solid electrolyte, which may be produced using a thin film technology based on magnetron sputtering or a similar approach.

US Patent Publication No. 20130071757A1 discloses an accumulator (battery) having a Li-containing solid electrolyte, which may be produced using a thin film technology based on magnetron sputtering or a similar approach.

Analysis of the prior art listed above reveals that starting from year 2000, researchers has been focused on improvements in materials and processes of manufacturing all-solid-state electrochemical power sources. However, parameters of modern thin film all-solid-state supercapacitors are still far from acceptable.

SUMMARY OF THE INVENTION

Contrary to usual wet supercapacitors, thin film supercapacitors cannot be used for electric vehicles, massive power storages, energy boosters and so on. Typically, all types of thin film solid-state supercapacitors mentioned above have received attention mostly as energy storage cells in the field of low power devices such as RFID tags, smart cards, Internet of things (IoT), microsensors, RAM modules, micro medical devices, etc. Such fields usually need very durable energy sources. The power sources should preferably be operable in a very wide temperature range, have long lifetime (from hundreds of thousands to tens of millions of cycles) and long shelf time (tens of years) without major changes of their parameters.

Additionally, they should preferably have acceptable capacitance and power characteristics as well as they should have high cell voltage and low ESR to provide possibility of cascade connection of a large number of low voltage cells. Unfortunately, existing solid-state and semi-solid-state supercapacitors cannot meet all the above-mentioned requirements, and even wet supercapacitors cannot meet tough temperature requirements.

The present invention therefore relates to thin film all-solid-state power sources having performance close to pseudocapacitors (or hybrid capacitors) with liquid electrolyte. In particular, the inventors have developed two types of devices, all-solid-state asymmetrical and all-solid-state symmetrical pseudocapacitors (or hybrid capacitors). These devices have a number of important advantages over liquid electrolyte devices. They are operable in a wide temperature range without significant degradation, do not contain toxic or flammable organic components and have improved service life and extended storage time. The new advanced power sources may be ideal for Internet of Things (IoT), sensors, other microelectronic devices and integrated solutions as well as for "lab-on-chip" microanalytic platforms.

The advantageous effects are achieved due to two broad aspects of the invention.

In a first broad aspect of the invention, there is provided an electrochemical power source comprising: a substrate; two current collector layers; two buffer/cache layers; a solid-state electrolyte layer, wherein each of the two buffer/cache layers is a layer of $Li_xM_yO_3$, while M is selected among Nb, Ta, Ti, V; X is provided in the range of 0.8 to 1.4; and Y is provided in the range of 1.2 to 0.6, correspondingly.

In the ideal case, the buffer/cache layer material corresponds to formula $Li_xM_{(2-X)}O_3$. However, it was proven experimentally that the invention is operable and the technical result is attained even if the ratio $Li_X:M_{(2-X)}$ is not maintained for the $Li_{0.8-1.4}M_{1.2-0.6}O_3$ material.

In such a power source, thickness of the buffer/cache layer may be in the range of 15 to 1000 nm, each layer may be in a form of a thin film, and the solid-state electrolyte layer may be an all-solid-state electrolyte layer.

Such a power source may further comprise at least one Faradaic layer, which may be a layer of $WO_{2.4-2.9}$:M1:M2:E1:E2:E3, or $MoO_{2.4-2.9}$:M1:M2:E1:E2:E3, wherein dopant M1 may be selected among Mo, Ti, Ni, V, Cr, Al, Nb, Ta, Co, Mn; dopant M2 may be selected among Mo, Ti, Ni, V, Cr, Al, Nb, Ta, Co, Mn; dopant E1 may be selected among H, N, C, Si, Ge, P, B; dopant E2 may be selected among H, N, C, Si, Ge, P, B; dopant E3 may be selected among H, N, C, Si, Ge, P, B, while M1 differs from M2 and E1, E2, E3 differ from each other. Thickness of the Faradaic layer may be in the range of 100 to 1000 nm.

The concentration of each of the dopants M1, M2 may be approx. 0.1% atomic to approx. 3% atomic, and preferably, their maximum concentration has to be evenly distributed over 30% or more of the Faradaic layer depth from the electrolyte side. Concentration of the dopants M1, M2 may be decreased (e.g., linearly or exponentially) at greater depth, but in the above-specified concentration range. Total content of dopants E1, E2, E3 may be approx. 3% atomic to approx. 40% atomic. Distribution of E1, E2, E3 atoms varies depending on the stored charge. In a charged state, E1, E2, E3 atoms concentrate at a border between the anode and the buffer/cache layer and/or drift into the anode structure. In a discharged state, E1, E2, E3 atoms concentrate at a border between the cathode and the buffer/cache layer and/or drift into the cathode structure.

In such a power source, each of the buffer/cache layers may be disposed between the solid-state electrolyte layer and the current collector layer or between the solid-state electrolyte layer and the Faradaic layer. The power source may further comprise an outer protective layer.

In a second broad aspect of the invention, there is provided a method of manufacturing an electrochemical power source, the method including: providing a substrate; forming two current collector layers; forming two buffer/cache layers; and forming a solid-state electrolyte layer, wherein each of the two buffer/cache layers is a layer of $Li_xM_yO_3$, while M is selected from Nb, Ta, Ti, V; X is in a range of 0.8 to 1.4; and Y is in the range of 1.2 to 0.6, correspondingly. The method may further include forming an outer protective layer.

In such a method, thickness of the buffer/cache layer may be provided in the range of 15 to 1000 nm, each layer may be formed as a thin film, and the solid-state electrolyte layer may be an all-solid-state electrolyte.

Such a method may further include forming at least one Faradaic layer, which may be a layer of $WO_{2.4-2.9}$:M1:M2:E1:E2:E3, or $MoO_{2.4-2.9}$:M1:M2:E1:E2:E3, wherein dopant M1 may be selected among Mo, Ti, Ni, V, Cr, Al, Nb, Ta, Co, Mn; dopant M2 may be selected among Mo, Ti, Ni, V, Cr, Al, Nb, Ta, Co, Mn; dopant E1 may be selected among H, N, C, Si, Ge, P, B; dopant E2 may be selected among H, N, C, Si, Ge, P, B; dopant E3 may be selected among H, N, C, Si, Ge, P, B. Thickness of the Faradaic layer may be in the range of 100 to 1000 nm.

In such a method, each of the buffer/cache layers may be disposed between the solid-state electrolyte layer and the current collector layer or between the solid-state electrolyte layer and the Faradaic layer.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE
PREFERRED EMBODIMENTS

Reference will now be made in detail to the preferred embodiments of the present invention, examples of which are illustrated in the accompanying drawings.

Implementation of solid-state pseudocapacitors with enhanced characteristics has become possible thanks to use of new materials with mixed type of conductivity (ionic and electronic), i.e., buffer/cache materials. The buffer/cache layers (intermediate layers) may be placed between solid-state electrolytes and electrodes and inside solid-state electrolytes, and they enable neutralizing traditional disadvantages of solid-state power sources (high internal resistance, low charge mobility, low power density, low voltage of cell, sensitivity to overvoltage and sensitivity to discharging below threshold value). Moreover, these power sources may be manufactured using the same thin film technology as the microelectronic devices, which are to be powered. This contributes to decreasing labor content and cost of final products.

Figure 1:
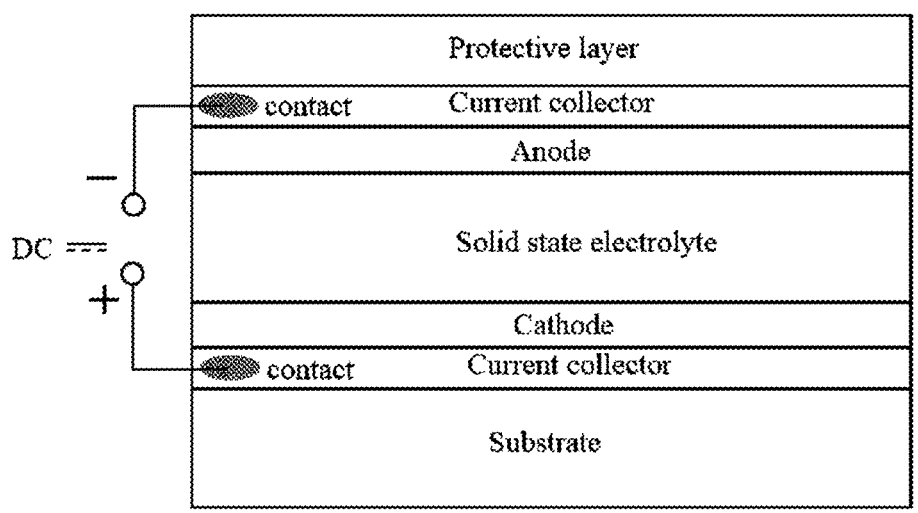
FIG. 1 shows a typical layered structure of a conventional TF-SS-LIB.
Figure 2:
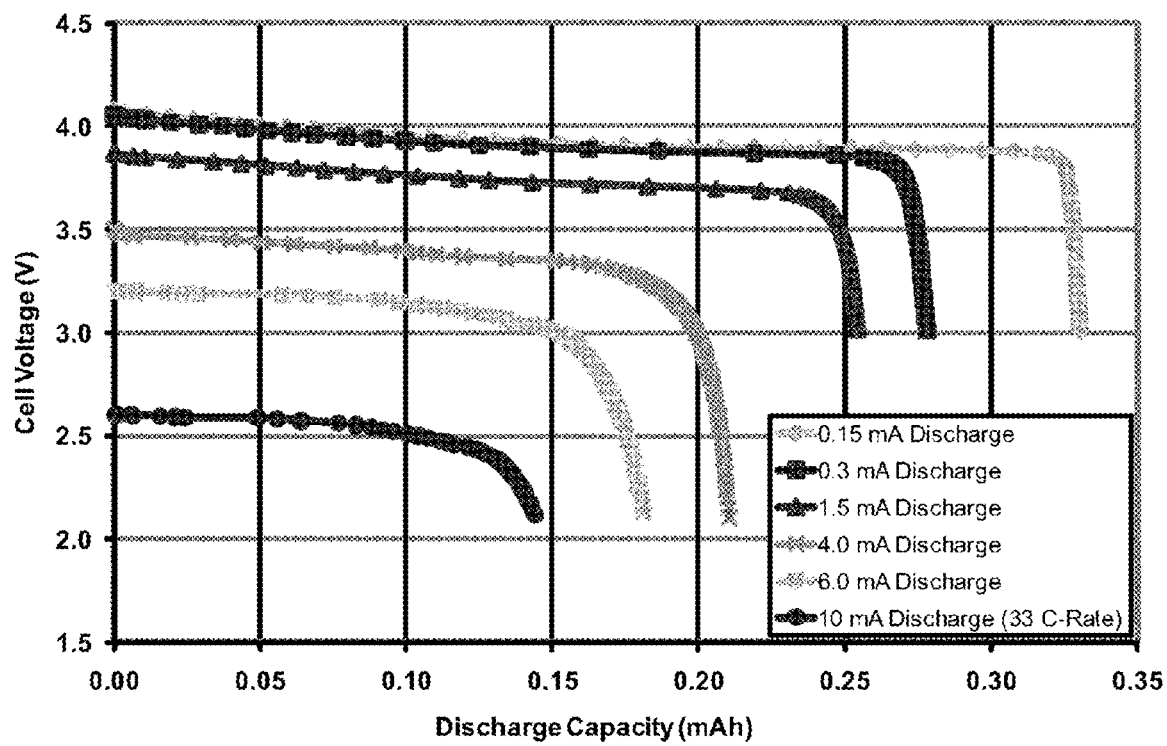
FIG. 2 shows typical discharge curves for a conventional TF-SS-LIB.
Figure 3A:
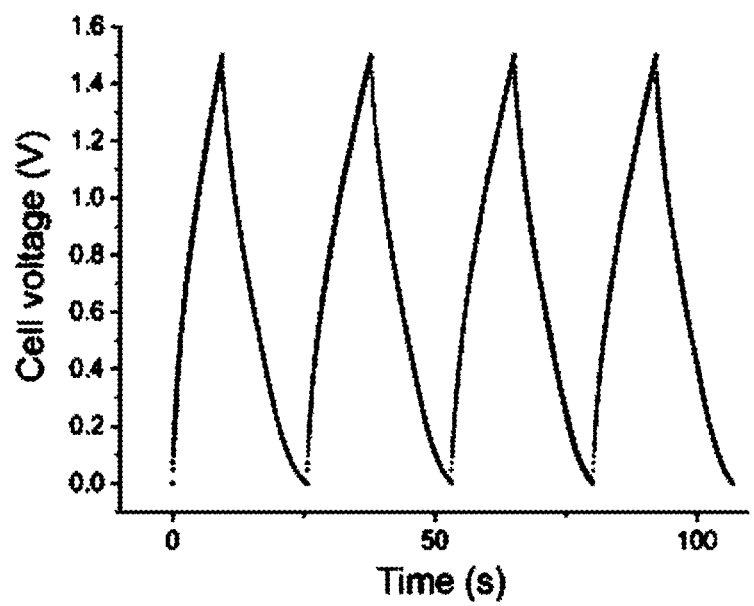
FIGS. 3A, 3B show typical charge/discharge behavior of a conventional EDLC (FIG. 3A) and a conventional pseudocapacitor (FIG. 3B), each having a liquid or gel-like electrolyte.
Figure 3B:
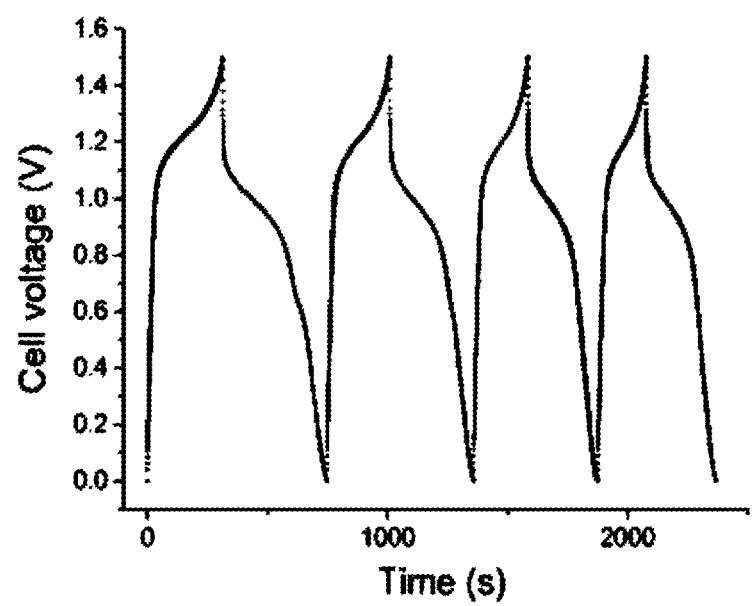
Figure 4A:
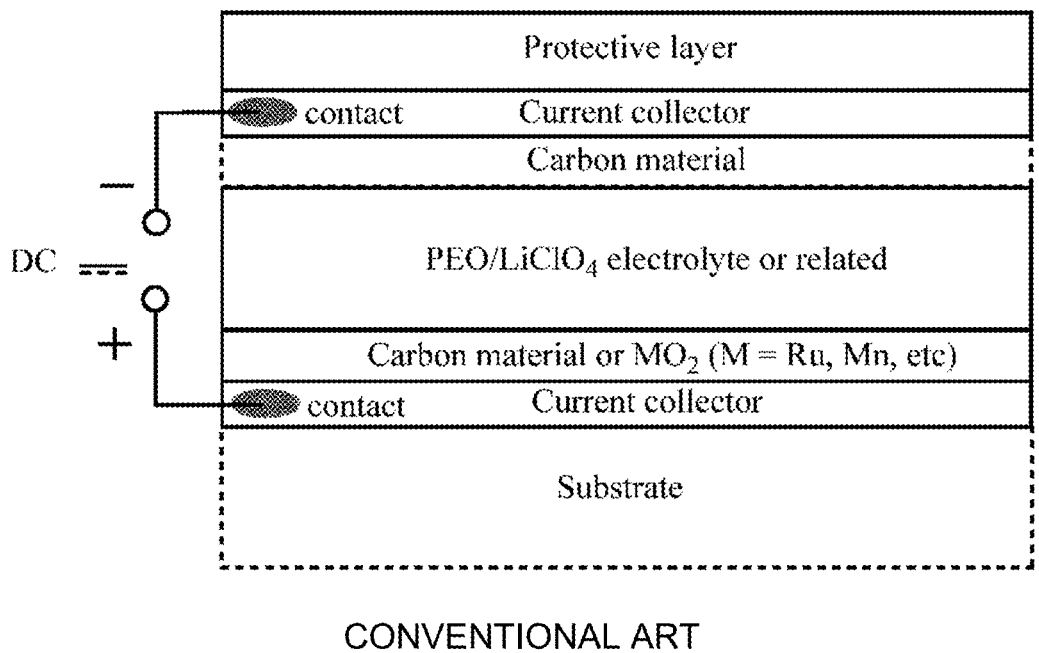
FIGS. 4A, 4B show a typical conventional layered structure of an asymmetrical semi-solid-state supercapacitor (FIG. 4A) and a conventional symmetrical semi-solid-state supercapacitor (FIG. 4B).
Figure 4B:
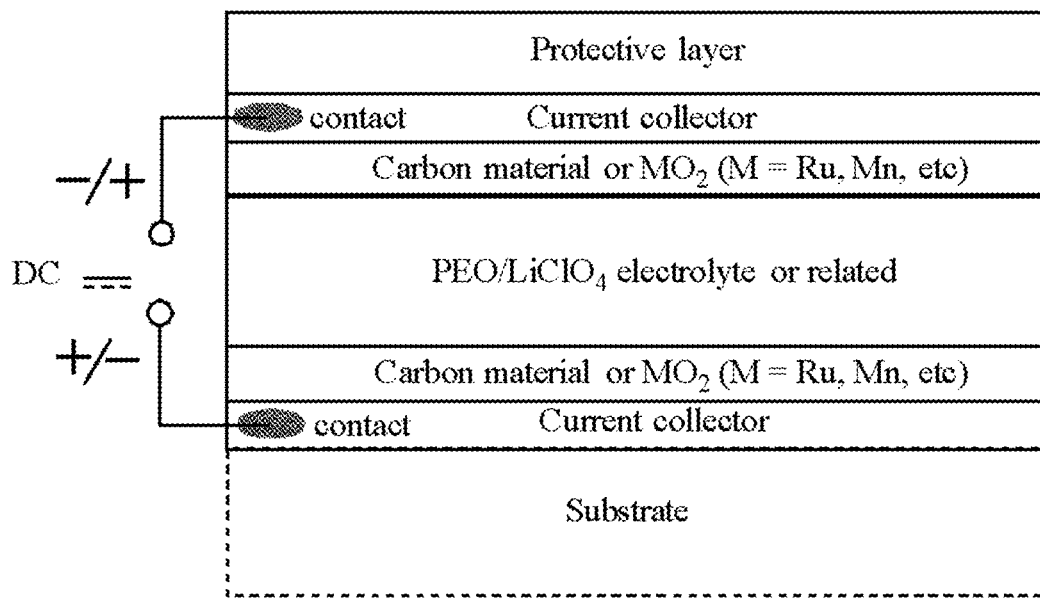
Figure 5:
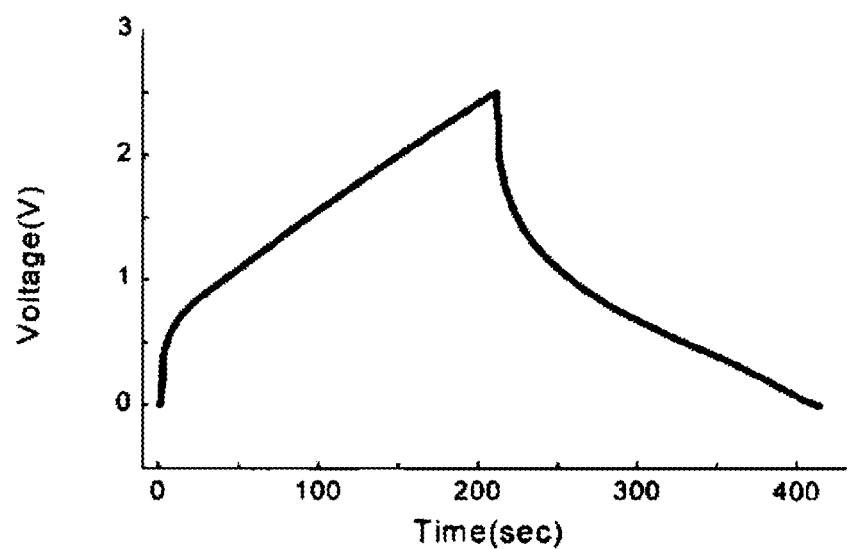
FIG. 5 shows a typical charge/discharge behavior of a conventional $RuO_2$/LIPON/$RuO_2$-based all-solid-state supercapacitor.
Figure 6A:
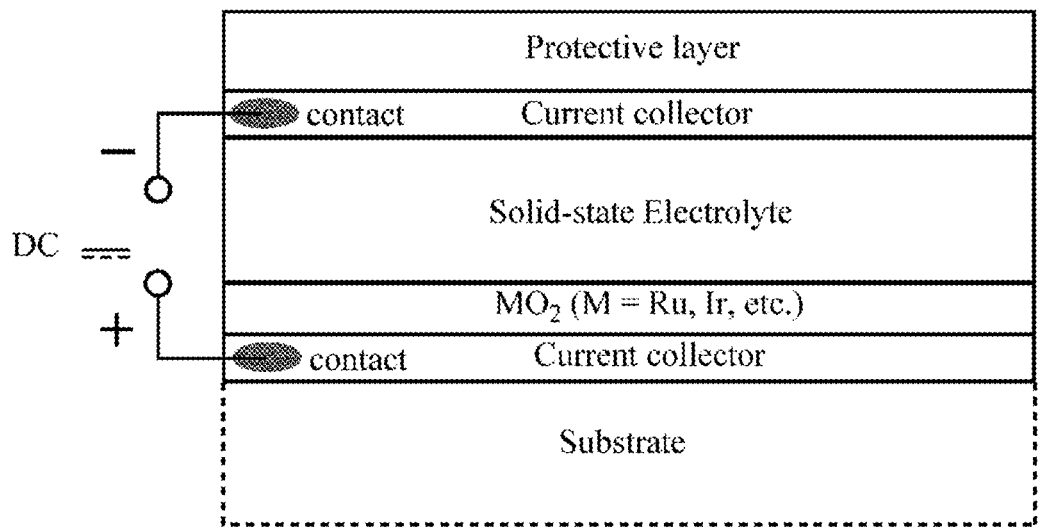
FIGS. 6A-6B show a typical layered structure of an asymmetrical conventional all-solid-state supercapacitor (FIG. 6A) and a symmetrical conventional all-solid-state supercapacitor (FIG. 6B).
Figure 6B:
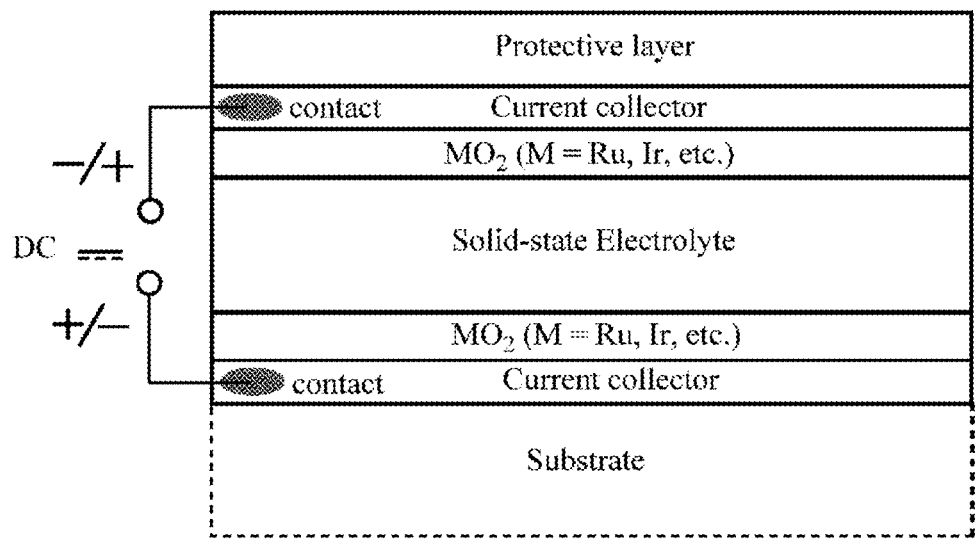
Figure 7:
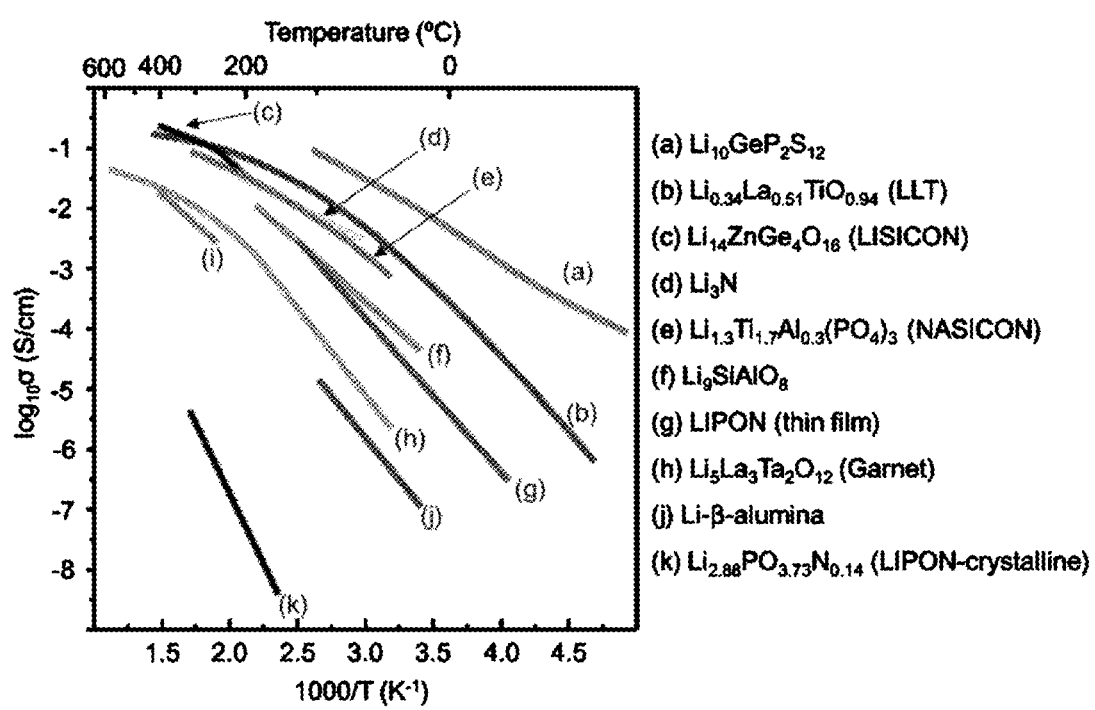
FIG. 7 illustrates dependence of $Li^+$-ion conductivity of different solid-state electrolytes on operational temperature.
Figure 8A:
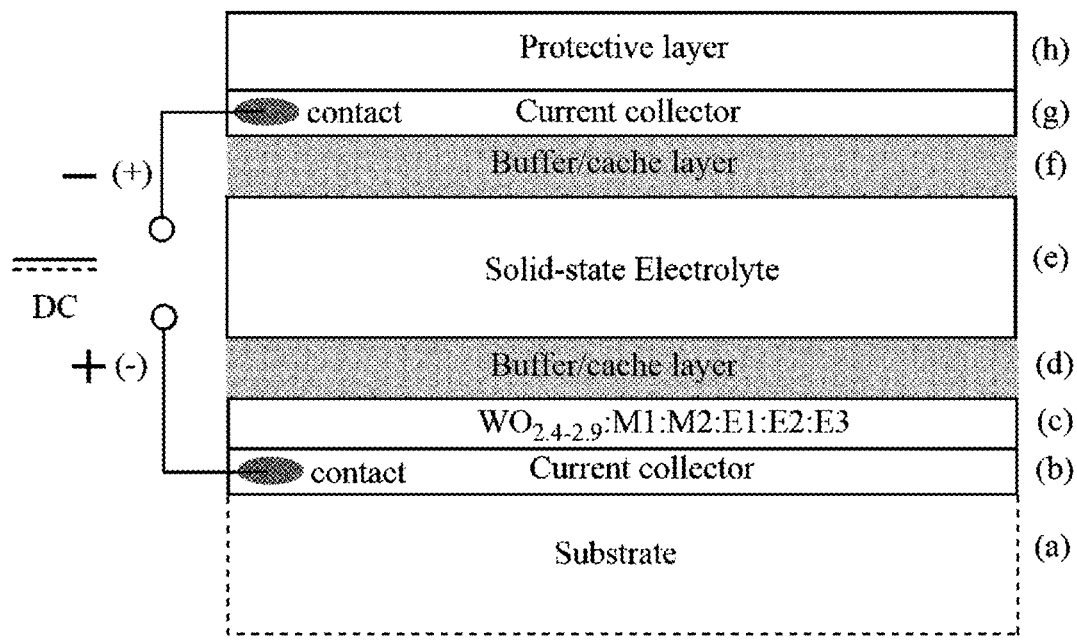
FIGS. 8A-8B show a layered structure of an AS-TF-SS-PSC (FIG. 8A) and a SY-TF-SS-PSC (FIG. 8B), according to the invention.
Figure 8B:
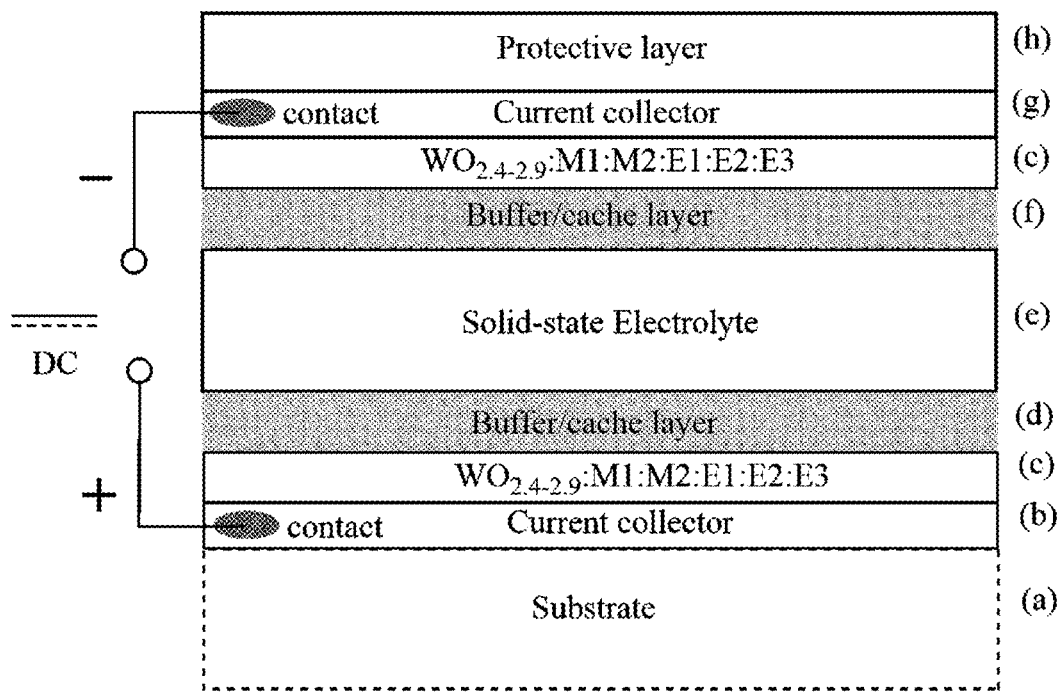

The inventors developed inorganic materials with switchable mixed conductivity in combination with advanced heavily doped metal oxide Faraday electrodes (see U.S. Provisional Application No. 62/699,770, which is incorporated herein by reference in its entirety), which contributes to improving performance of all-solid-state power sources substantially. Based on these materials, the inventors obtained working prototypes of all-solid-state thin-film asymmetrical (AS-TF-SS-PSC) and symmetrical (SY-TF-SS-PSC) Li-ion pseudocapacitors (FIGS. 8A-8B).

For instance, symmetrical supercapacitors operate using "stacking" double electric layers, one layer over another. It is possible due to an abrupt change of conductivity of buffer/cache layers from mostly ionic to mostly electronic and backward. Consequently, there is no necessity in normal diffusion and mass-transfer of $M^{n+}$ ions (e.g., $Li^+$ ions) during charge and discharge processes. Charge accumulation is performed as a result of abrupt change of ratio M(host):$M^{n+}$ (guest), where M(host) is Ta, Nb, V, etc., in metal oxide environment of buffer/cache layers. Taking into consideration that there is no need in full mass transfer (diffusion) for operation of such power sources, the inventors have successfully reduced the effect of poor lithium-ion conductivity of solid-state electrolytes on the operating behavior of the invented power sources.

However, the process of switching conductivity from ionic to electronic and vice versa in buffer/cache materials is not perfect. For switching conductivity, lithium concentration should be changed (increase or decrease). That is why some diffusion of lithium ions is still needed. However, unlike "classical" diffusion to the full depth of the electrode material, a "wave-like" diffusion occurs in this case, similar to transmission of electricity over a distance by means of alternating current.

Thus, the inventors proposed an energy storage (and charge transfer technology), which is not electrostatic or mostly faradic in its nature, and which is based on a combination of several factors, including switching electron and ion conductivity due to "wave-like" changes in the ion concentration ratio M(host):$M^{n+}$ (guest).

Figure 9A:
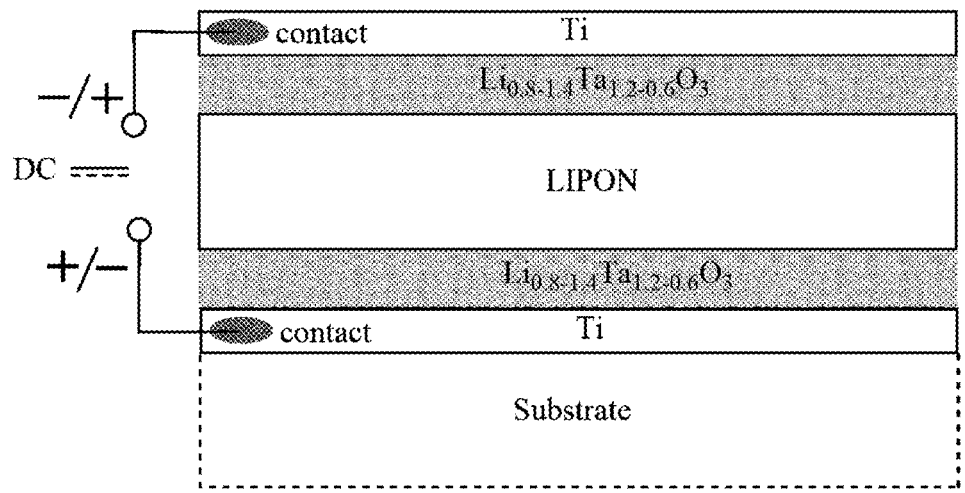
FIGS. 9A-9B show a layered structure of simplified test samples of a SY-TF-SS-PSC according to the invention, with LIPON electrolyte (FIG. 9A) and without LIPON electrolyte (FIG. 9B).
Figure 9B:
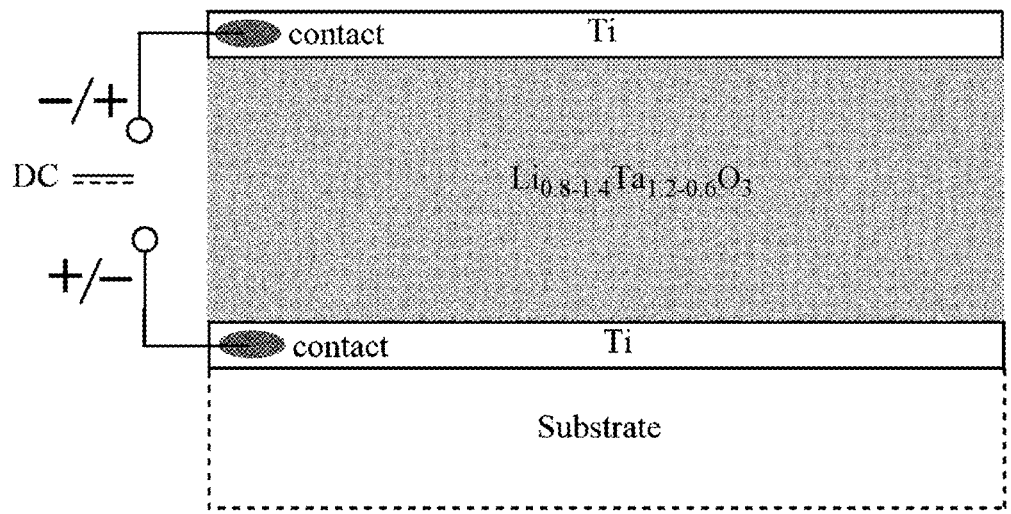

For a better explanation of the invention operation and energy storage principle in these materials, a simple symmetrical sample was built (FIGS. 9A-9B). This is a simplified example of SY-TF-SS-PSC developed by the inventors.

This device usually has high OCV of ±3.3-5.0 V (which may reach even 7.0-11.0 V for a short period with no further degradation of material), and its capacity depends only on thickness of $Li_{0.8-1.4}Ta_{1.2-0.6}O_3$ layer (buffer/cache layer).

Therefore, energy storage approach in the illustration sample of the developed supercapacitor differs from what is generally accepted. More specifically, it is based on the fact that buffer/cache layer material ($Li_{0.8-1.4}Ta_{1.2-0.6}O_3$) may be in two discrete conduction states ($e^-$ conductivity greatly exceeding $Li^+$ conductivity or $Li^+$ conductivity greatly exceeding $e^-$ conductivity). In other words, it may be either substantially electron ($e^-$) conductor (which may be found in the buffer/cache layer volume) or substantially positive ion (Li) conductor (which may be found in the border between the anode or cathode and the buffer/cache layer), and also may have mixed conductivity (electron-ion), which is not stable during charging or discharging process.

Figure 10:
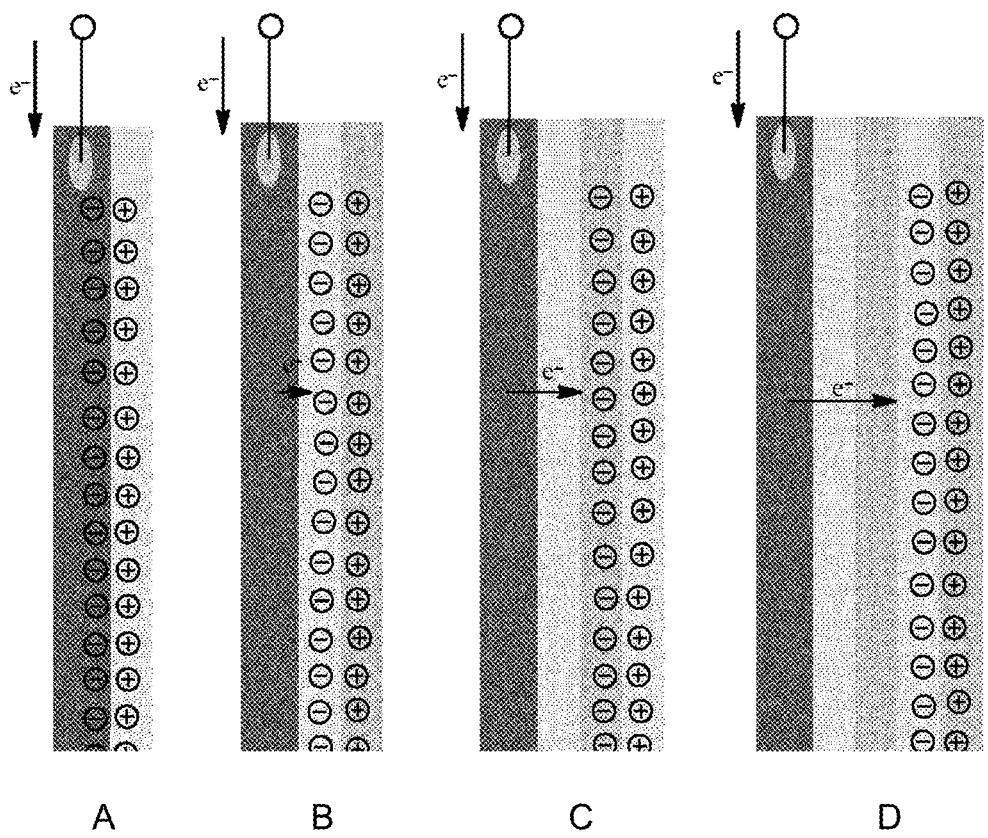
FIG. 10 illustrates charging process in a buffer/cache layer of a TF-SS-PSC according to the invention.

In this case, the charging process proceeds like this (FIG. 10):primarily the material has a mixed type of conductivity; then during the charging process, a double electric layer is formed at the boundary between a conductor and the material, like in typical wet supercapacitors. However, then, due to re-proportion of atoms Li:Ta in $Li_{0.8-1.4}Ta_{1.2-0.6}O_3$ within the double electric layer, the buffer/cache layer material changes into electron conductivity state, which extends to the whole thickness of the primarily formed double electric layer. Further, the second area of the double electric layer is formed, which also eventually changes into the material with electronic conductivity and "leaves" mixed conductivity state. Thus, the modified layer propagates in a jump-like or wave-like manner, while modifying state of electronic conductivity and consequently switching the buffer/cache layer material from mixed conductivity state to electronic conductivity state. The discharge process of $Li_{0.8-1.4}Ta_{1.2-0.6}O_3$ proceeds in a similar way, but in a reverse order.

Such way of storing energy has a number of advantages over conventional redox approach or over approach based on $Li^+$ ion diffusion.

Required diffusion of $Li^+$ ions within volume of buffer/cache layer is minimal (it is only necessary for re-proportion of Li:Ta ratio and consequently for discrete change of the conductivity type); that is why the above-discussed limitation of performance of the solid-state device due to low $Li^+$ ion conductivity of solid-state electrolytes is practically leveled off. In particular, it positively affects the range of operational temperature of the device. AS(SY)-TF-PSC devices are able to work at a quite broad temperature range of −50 to +150° C. At extreme temperatures, the devices maintain ability to output current and receive charge.

Energy stored in buffer/cache layer depends only on the thickness of the $Li_{0.8-1.4}Ta_{1.2-0.6}O_3$ layer, in other words, it depends on number of "packed" double electrical layers within the buffer/cache layer.

Since there is no significant physical change of lithium concentration during charging and discharging processes, it does not have much effect on intercalation and de-intercalation of Li (cycling), since the change of its amount at charge and discharge is not essential. Consequently, lifetime of such an energy source may be practically unlimited.

According to the simplified symmetrical sample (FIGS. 9A-9B), the buffer/cache layer materials are able to operate as cathode, anode or electrolyte. The energy storage devices may be built by using only one active material layer with switchable conductivity type and current collectors.

Due to a combination of discrete conductivity change and limited amount of mobile lithium in the solid-state electrolyte, devices involving materials of $Li_{0.8-1.4}Ta_{1.2-0.6}O_3$ type may be charged with high current and at a large potential difference, up to breakdown voltage (about 20V for devices with a thickness of 1.2-2.5 m) without noticeable degradation of electrode materials. It is quite advantageous as it allows avoiding use of additional electronic circuitry for cell balancing in series-parallel assemblies and cell overvoltage protection in most cases.

Buffer/cache layer materials may be used for electrode protection of Li-ion batteries and supercapacitors based on existing technologies against overcharging and discharging below the cut off voltage. With saturation of anode (at charging) or cathode (at discharging) with lithium, the conductivity inevitably abruptly changes from ionic to electronic in the buffer/cache layer, so further charging or discharging, i.e., ion diffusion into anode or cathode, becomes impossible and, consequently, the process of charge or discharge stops. It ensures opportunity of producing batteries and supercapacitors significantly cheaper by avoiding use of microelectronics for balancing the battery cells. It also makes the power sources safer.

In addition, such materials with switchable type of conductivity most probably may protect anode lithium surface against formation of dendritic points.

The described technique was used in a simplified symmetric solid-state supercapacitor sample (FIG. 9A-9B). It does not allow achieving high capacity, since Faraday processes and change of the mass are not used for storing and releasing a charge. Therefore, extra layers were added, thus allowing accumulation and storage of the charge on the electrodes due to faradic redox processes to increase the capacity of the device (FIGS. 8A-8B). Depending on distribution of applied materials, the device may be built either asymmetric (with one faradic electrode, FIG. 8A) or symmetric (with two faradic electrodes, FIG. 8B). Potential difference between electrodes in the first case is provided by the fact that lithium intercalated materials of $W(Mo)O_{2.4-2.9}M1:M2:E1:E2:E3$ type have practically linear dependence of the potential on concentration of intercalated lithium (the more lithium, the higher potential).

Therefore, potential difference of a cell of $Li_{0.6-3.0}W(Mo)O_{2.4-2.9}M1:M2:E1:E2:E3$–solid-state electrolyte—$W(Mo)O_{2.4-2.9}M1:M2:E1:E2:E3$ type may be defined in a simplified way by the difference of potentials $|\Delta E|=E(Li_{0.6-3.0}W(Mo)O_{2.4-2.9}M1:M2:E1:E2:E3)-E(W(Mo)O_{2.4-2.9}M1:M2:E1:E2:E3)$. Taking into consideration the nature of potential change in such cathode materials, this difference will not be substantial.

In the asymmetrical device, energy is stored in faradic electrode (cathode) and accumulated as a "stack" of double layers in the buffer/cache layer in another electrode (anode). Moreover, the asymmetric device has the buffer/cache layer on the cathode as well, but it performs only protective functions and some buffer functions, as described in the above. The advantage of AS-TF-SS-PSC over its symmetric analogue SY-TF-SS-PSC is that potential difference between anode and cathode is defined as $|\Delta E|=E(Li_x\{buffer/cache\ layer\})-E(W(Mo)O_{2.4-2.9}M1:M2:E1:E2:E3)$. This potential difference is relatively high (2.9-3.3 V). Faradic electrode provides relatively high capacity and good dynamics of discharging the device to an effective load, while mobility of lithium ions in the anode (which is buffer/cache layer) is very high.

All these features allow achieving excellent capacitive and power characteristics for the asymmetric device.

(A) AS-TF-SS-PSC is operable in wide temperature range (−50 to +150° C.), as only inorganic materials and their unique combinations are used in the invented device. They also may be stored at a temperature up to +250° C. for a long time with no noticeable degradation of its operational parameters.

(B) Thickness of an AS-TF-SS-PSC including its current collectors is not more than 2.5 μm.

(C) An AS-TF-SS-PSC may have a relatively high OCV 2.9-3.3 V per cell.

Figure 11:
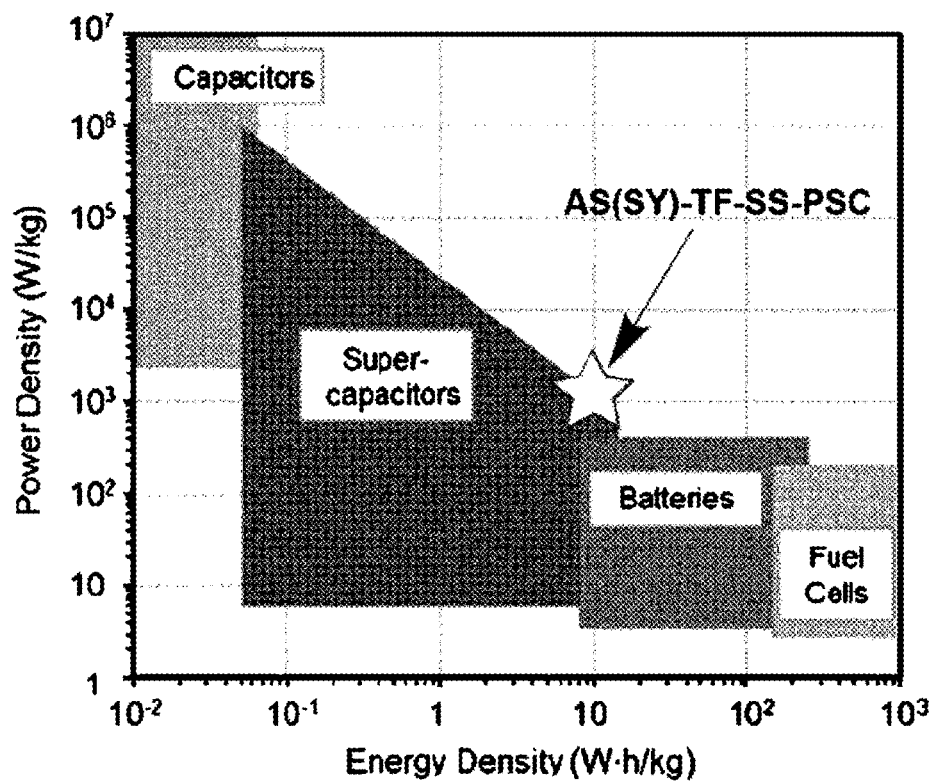
FIG. 11 shows a Ragone plot widely used for performance comparison of various energy-storing devices; the values of specific power (in W/kg) are plotted versus specific energy (in Wh/kg).

(D) Specific capacity for active layers (including current collectors) of an AS-TF-SS-PSC is about 8-10 Wh/kg and their power density may reach 2-5 kW/kg. These characteristics are not typical for all-solid-state devices and rather may be referred to conventional supercapacitors, pursuant to Ragone plot (FIG. 11).

(E) Operational Lifetime of a bare AS-TF-SS-PSC is more than 100,000 cycles; for an isolated AS-TF-SS-PSC operational lifetime may reach millions of cycles.

(F) Shelf life of an AS-TF-SS-PSC is almost unlimited.

(G) In contrast to conventional lithium batteries, an AS-TF-SS-PSC may be discharged down to 0 V without losing or degrading its functionality.

Figure 12:
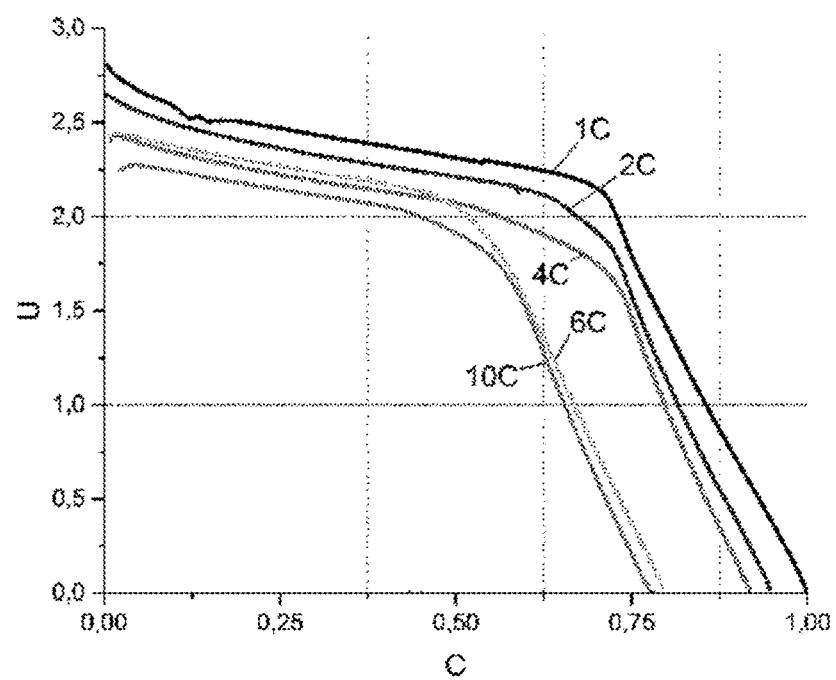
FIG. 12 shows discharge curves of an AS-TF-SS-PSC according to the invention at different C-rates.

(H) In contrast to typical supercapacitors, an AS-TF-SS-PSC has a relatively flat discharge curve (more like batteries) in the voltage range of 2.6-1.7 V (FIG. 12), which makes them applicable for direct powering most of modern microcircuits.

Moreover, both symmetrical and asymmetrical TF-SS-PSCs may be made transparent and thus may be applied on substrates made of glass, polymer films and ceramics for various optical applications. These substrates may have quite large area.

Additionally, the charge in both symmetrical and asymmetrical devices may be reversed during operational. However, capacity of an asymmetrical device in the reverse charged direction is limited by its buffer/cache layer capacity, as faradic processes are not involved in this operation mode.

Applicable Materials

FIG. 8A shows layered structure of an AS-TF-SS-PSC according to the invention; FIG. 8B shows layered structure of a SY-TF-SS-PSC according to the invention.

Substrate (a) provides a mechanical base for the upper layers. The following materials may be used in the substrate: Si/SiO$_2$ wafer, sapphire, glass, ceramics, PET and PEN films, KAPTON film, etc. Thickness of a polymer flexible substrate may be 120-250 μm, while thickness of a rigid substrate may be in the range of 0.45-4 mm.

Current collector (b), (g) provides electrical connection of external conductors to the TF-SS-PSC inner structure. The following conductive materials may be used in the current collectors: Ti, Mo, Cr, Cu, NiCr, Al, Au, Ag and their combinations, such as Ti/Al, Cr/Cu, Cr/Au, NiCr/Cu, NiCr/Au, Mo/Au, etc. In the combinations, one of metals may form an adhesive layer and another one or more may provide conductive function. Usually, the conductive layer of the current collector has significantly greater thickness than the adhesive layer, but the overall thickness of the current collector is usually within 200-250 nm, depending on the conductive materials used. When the TF-SS-PSC is required to be transparent or semi-transparent, then a transparent conductive oxide film (TCO) materials may be used for the current collectors. The TCO material may be, e.g., indium tin oxide (ITO), fluorine doped tin oxide (FTO), indium zinc oxide (IZO), indium zinc tin oxide (IZTO), gallium zinc oxide (GZO), etc. Thickness of the TCO material layer may range from 100 to 750 nm, but usually it does not exceed 200 nm.

External conductors may be provided in a form of conventional insulated or non-insulated wires, printed circuit board (PCB) conductors, flexible polyimide-based conductors, etc., as would be apparent to a person skilled in the art. Connection of the external conductors to the current collectors may be provided by welding (like split-tip welding, ultrasound welding, electron beam welding, laser welding and so on), soldering (like soft soldering, brazing, reflow soldering with a fine-dispersed solder and so on), or any other applicable technique known in the art.

Buffer/cache layers (d), (f) ensure the performance of the proposed TF-SS-PSC. The buffer/cache layers are disposed between the current collectors or the Faradaic layers and the solid-state electrolyte.

The buffer/cache layer includes materials like $Li_{0.8-1.4}Ta_{1.2-0.6}O_3$, $Li_{0.8-1.4}Nb_{1.2-0.6}O_3$, $Li_{0.8-1.4}Ti_{1.2-0.6}O_3$, $Li_{0.8-1.4}V_{1.2-0.6}O_3$ and doped combinations with other elements. This layer has a mixed switchable type of conductivity ($e^-$ and $Li^+$). Thickness of the layer varies between 15 and 1000 nm. In some devices the buffer/cache layers may have non-symmetrical thickness, e.g., thickness of a pre-anode layer may be 20 nm, while thickness of a pre-cathode layer may be 60 nm. Modification of proportion of Li to Ta, Nb, Ti and V allows for a discrete change in conductivity nature from mainly lithium-ion conductivity to mainly electron conductivity, while hole conductivity varies insufficiently.

Faradaic layer (c) is a layer of $W(Mo)O_{2.4-2.9}$:M1:M2:E1:E2:E3 (where each of M1,2 is Mo, Ti, Ni, V, Cr, Al, Nb, Ta, Co or Mn; each of E1, E2, E3 is H, N, C, Si, Ge, P or B) providing Faraday processes typical for pseudocapacitors. The Faradaic layers may be obtained by heavily doping of tungsten or molybdenum oxides. Doping with non-metallic elements (N, C, Si, Ge, P, B) is used to increase electrical conductivity as well as to decrease "deep ion-trapping" effect of the $WO_x$ host material [18], [19]. Heavily doping tungsten or molybdenum oxides with variable valence metal oxides and non-metal elements also makes the discharge curve flatter (battery-like), allows enhanced cyclability of the Faradic layer materials and facilitates diffusion of $Li^+$ ions, so the actual capacity of the Faradic layer is improved.

Furthermore, the Faradic layer can be extended by $Li^+$-ion pre-intercalation followed by "thermo-split" at annealing. In this case, the material is structured in such a way that vertical channels are formed, which facilitates subsequent intercalation and de-intercalation of metal ions and, as a result, the material capacity and charge/discharge rate increases 5-10 times. Mono-crystallites formed at annealing are more resistant to cycling and the material lifetime extends considerably.

Solid-state electrolyte (e) may be selected, for example, from LIPON, $Li_{1.3}Ti_{1.7}Al_{0.3}P_3O_{12}$ (NASICON), $Li_{14}ZnGe_4O_{16}$ (LISICON), $Li_{0.34}La_{0.51}TiO_{0.94}$ (LLT), $Li_9SiAlO_8$, $Li_5La(Sr)_3Ta_2O_{12}$ (LLTO/LSTO/LLSTO), $Li_7La_3Zr_2O_{12}$ (LLZO), $Li_{1.3}Al_{0.3}Ti_{1.7}(PO_4)_3$:$N_x$ (LATPN), $Li_{6.24}La_3Zr_2A_{0.24}O_{11.58}$ (LLZAO), $Li_{6.75}Al_{0.2}La_3Zr_{1.75}Ta_{0.25}O_{12}$ (LALZTO), $Li_7La_3Zr_{1.7}Nb_{0.25}O_{12}$ (LLZNO), $Li_{6.4}La_3Zr_{1.4}Ta_{0.6}O_{12}$ (LLZTO), $Li_{0.33}La_{0.56}Nb_{0.8}O_3$ (LLNO), $Li_3Sc_2(PO_4)_3$:$N_x$ (LSPON), $Li_{3.5}Sc_{1.6}Al_{0.4}(PO_4)_3$:$N_x$ (LSAPON), $Li_{3.5}Sc_{1.6}Y_{0.4}(PO_4)_3$:$N_x$ (LSYPON), $Li_{2.2}Mn_{0.8}SiO_4$ (LMSO), $Li_{3.5}PW_{0.01}O_{2.1}$:$N_x$ (LIPWON), $Li_{2.2}V_{0.54}Si_{0.4}O_{0.32}$ (LVSO), $Li_{0.77}Ti_2Si_{0.3}P_{2.7}O_{10.8}$:$N_x$ (LT-SPON), etc.

Protective layer (h) protects the TF-SS-PSC structure against environmental influence including ambient atmosphere and mechanical scratches. Usually, this layer is made of a polymer-based multilayer film used for lamination of $Li^+$ ion pouch cells (polymer-polymer, metal-polymer, polymer-metal-polymer or the like). However, in some cases other insulation approaches may also be used, including deposition of polytetrafluoroethylene (PTFE), polyethylene, polypropylene or parylene, sealing with silicon compounds or deposition of inorganic materials, such as $Si_3N_4$, $Al_2O_3$, $MgO.Al_2O_3$, $SiO_2$, etc. In some embodiments, the outer protective layer may cover the upper layer of the stack of layers; in some other embodiments, the protective layer may cover the whole stack of layers, including side portions and/or the bottom portion of the TF-SS-PSC structure.

A combination of buffer/cache layers (d) and (f) of mixed conductivity type with a Faraday layer (c) allows increasing the device capacity. Layers (d) and (f) in such devices operate as a cache layer as well, which enables neutralizing of slow diffusion process of lithium ions into materials of the layer (c). It improves performance of a solid-state pseudocapacitor to be similar to ones of wet supercapacitors. OCV and TV of the invented devices are also high and IR drop is acceptable. Combination of flat discharge curve (in the range of 2.6-1.7 V under load, FIG. 12) and long lifetime along with a wide operational temperature range makes these power sources advantageous for many applications.

Applicable Methods and Equipment

All the TF-SS-PSC layers may be deposited by a suitable deposition technique commonly accepted in the art. For example, they may be deposited by reactive magnetron sputtering either in DC, or Pulsed-DC, or RF mode using appropriate production equipment. During TF-SS-PSC prototyping, samples were built using P30 research magnetron system (Intermolecular Inc., USA) [20]. The layer stacks were built by consecutive sputtering of different ceramic and metallic target materials in a controlled atmosphere with or without vacuum break.

Preparation of the Substrate Surface

Various substrates (a) compatible with metals or transparent conductive oxides (TCO) may be used for implementation of the proposed TF-SS-PSC. Various metals and their combinations as well as wide range of TCO materials used for forming the current collectors (b) may be deposited directly onto the substrate. Substrates like Si/SiO$_2$/M, sapphire/M Glass/M, Ceramic/M, KAPTON/M (M=Ti, Mo, Cr, Cu, NiCr, etc.) also may be used. Thickness of a metal layer usually does not exceed 250 nm. It is important to provide a thoroughly smooth base surface, as even a small defect may lead to short circuits during assembly or during operation of the cell. Usually sheet resistance of such substrates is in the range of 2-4 Ohm/square.

Custom-made substrates like glass/SiO$_2$/TCO, PET/SiO$_2$/TCO, PEN/SiO$_2$/TCO as well as commercial substrates based on TCO glass may also be used. TCO thickness may be about 100-200 nm. Usual sheet resistance is 12-14 Ohm/square. As an alternative to TCO, such ITO materials as IZO, IZTO, AZO and GZO and their combinations with metals TCO/M/TCO (M=Ag, Cu, Au, Al, Mg, W, Mo, Zn, Ni, Cr, Ta, Ti) may be used [21]. Additionally, widely used commercial K-Glass™ substrates, glass/SiC$_x$O$_y$/FTO of typical facade glass, 4 mm (Pilkington Glass) with sheet resistance of 11-13 Ohm/square may be employed.

However, most custom-made and commercial TCO-coated glass substrates have surface defects (holes, chips, scratches). The proposed TF-SS-PSC is rather thin, so such defects may cause short circuits and other fails, which may lead to a large scrap rate. To avoid such defects and provide a smooth TCO surface, the following approach may be used: a thin layer of Zn or Al is applied on a glass/barrier-layer/TCO structure by thermal deposition or magnetron deposition or the like. Then the applied metal is etched using HCl or KOH, respectively. This process may be repeated several times, until a uniform and smooth enough TCO-coated substrate surface is produced. The inventors have found that this approach allows avoiding short circuits between the TF-SS-PSC layers.

A barrier layer ($SiO_2$, $TiO_2$, $Si_3N_4$, etc.) may be deposited on the coated substrate (a) so as to provide a barrier for the $Na^+$ or $Li^+$ diffusion in/out of the substrate material through the current collector layer, either to enhance the adhesive properties and/or form a seed layer for subsequent sputtering.

As an example, in the TF-SS-PSC prototype production, $SiO_2$ coating (20-30 nm) was deposited on glass by reactive pulsed magnetron sputtering. Three-inch Si targets of 99.98% purity were sputtered in a mixed $Ar/O_2$ atmosphere of 99.998% purity. The coatings were grown up on top of 60×100 mm substrates, with two-fold planetary rotation during deposition. Before a start of the deposition, the chamber was pumped down to a base pressure below $1 \cdot 10^{-8}$ Torr at a room temperature. The total pressure was between 2 and 15 mTorr during deposition. A Pulsed-DC power supply (RPDG-50, MKS INSTRUMENTS, USA) was used to deliver a power of 200 to 400 W to each of the sputtered targets at a frequency between 100 and 250 kHz and an off-duty cycle of up to 40%. A voltage hysteresis loop for the system was determined before the deposition series. The films were deposited while operating on the edge of the transition mode between the metallic and poisoned state of the target material in order to provide a high deposition rate and obtain stoichiometric films. In order to run the system in this transition mode, the cathode current was used as an oxygen partial-pressure feedback signal for controlling the reactive sputtering process to determine how often the target should be burned to reduce poisoning of the surface while maintaining desired deposition rate and ensuring required properties of the grown film.

Obtaining the Current Collector Layers

Further, the current collector layers (b) and (g) may be manufactured using any appropriate metal deposition technique apparent to a person skilled in the art.

In one TF-SS-PSC prototype production, TCO or TCO/M/TCO combinations (ITO, IZO, IZTO, AZO, GZO and TCO/M/TCO, wherein M is Ag, Cu, Au, Al, Mg, W, Mo, Zn, Ni, Cr, Ta, Ti) were deposited by RF magnetron sputtering for obtaining collector layers (100-250 nm). Three-inch ceramic TCO targets of 99.98% purity were sputtered in pure Ar or mixed Ar/02 atmosphere of 99.998% purity. The coatings were grown up on top of the barrier layers obtained at the previous step with twofold planetary rotation during deposition. Before the start of the deposition, the chamber was pumped down to a base pressure below $1 \cdot 10^{-8}$ Torr and the substrates were heated to a temperature slightly higher than the deposition temperature of +150 . . . +200° C. The total pressure was between 2 and 15 mTorr during deposition. An RF power supply (R601 generator with MC2 automatic matching network controller, Seren IPS Inc., USA) was used to deliver 150-300 W to the sputtered target at RF Match Tune of 30-60% and RF Match Load of 45-85% with a RF Reflect Power of less than 1 W.

In other TF-SS-PSC prototype production, metallic current collector layers (180-250 nm) were deposited by pulsed magnetron sputtering of three-inch or two-inch metallic targets of 99.96-99.996% purity in pure Ar atmosphere of 99.998% purity. The coatings were grown up on top of the barrier layers obtained at the previous step with twofold planetary rotation during deposition. Before start of the deposition, the chamber was pumped down to a base pressure below $1 \cdot 10^{-8}$ Torr and the substrates were heated to a temperature slightly higher than the deposition temperature of +150 . . . +200° C. The total pressure was between 2 and 15 mTorr during deposition. A Pulsed-DC power supply (RPDG-50, MKS INSTRUMENTS, USA) was used to deliver 100-300 W to each sputtered target at a repetition frequency between 100 and 250 kHz and an off-duty cycle of up to 40%.

Obtaining the Faradic layers

Faradic layers (c) of $WO_{2.4-3.2}$:M1:M2:E1:E2:E3 may be produced by various methods providing application of such materials.

In the TF-SS-PSC prototype production, the Faradic layers (c) (100-1000 nm) were deposited by reactive pulsed magnetron sputtering. Usually two to four metallic three-inch or two-inch targets of 99.96-99.998% purity were co-sputtered in a mixed atmosphere of 99.998% purity (see U.S. Provisional Application No. 62/699,770). The coatings were grown on top of the lower current collector layer (b) only (in the AS-TF-SS-PSC) or both on top of the lower current collector layer (b) and of the buffer/cache layer (g) (in the SY-TF-SS-PSC), with two-fold planetary rotation during deposition. Before start of the deposition, the chamber was pumped down to a base pressure below $1 \cdot 10^{-8}$ Torr at a room temperature. The total pressure during deposition was between 2 and 15 mTorr.

A Pulsed-DC power supply (RPDG-50, MKS INSTRUMENTS, USA) was used to deliver a power of 100-500 W to the sputtered targets at a frequency between 100 and 250 kHz and an off-duty cycle of up to 40%. A voltage hysteresis loop for the system was determined before the deposition series. The films were deposited while operating on the edge of the transition mode between the metallic and poisoned state of the targets in order to provide a high deposition rate and obtain stoichiometric films. In order to run the system in the transition mode, the cathode current was used as an oxygen partial-pressure feedback signal for controlling the reactive sputtering process to determine how often the target should be burned to reduce poisoning of the surface while maintaining desired deposition rate and ensuring required properties of the grown film.

Obtaining the Buffer/Cache Layers

The buffer/cache layer is an important part of the proposed TF-SS-PSC. It is a lithium-based compound $Li_XM_YO_3$, wherein M may be Nb, Ta, Ti, V etc., X may be in a range of 0.8 to 1.4 and Y may be in a range of 1.2 to 0.6, correspondingly.

In the TF-SS-PSC prototype production, the $Li_{0.8-1.4}M_{1.2-0.6}O_3$ (M is Nb, Ta, Ti, V, etc.) materials of the buffer/cache layer (d) and (f) having thickness of 15-1000 nm were deposited by RF magnetron sputtering. Three-inch ceramic $Li_XM_YO_3$ targets of 99.97% purity were sputtered in a mixed $Ar/O_2$ atmosphere of 99.998% purity. The coatings were grown up on top of the Faradic layer (c) or on top of the solid-state electrolyte layer (e), correspondingly, with twofold planetary rotation during deposition. Before start of the deposition, the chamber was pumped down to a base pressure below 1·10⁻⁸ Torr and the substrates were heated to a temperature of +150 . . . +200° C. The total pressure was maintained between 2 and 15 mTorr during deposition. A RF power supply (R601 generator with MC2 automatic matching network controller, Seren IPS Inc., USA) was used to deliver 150-300 W to the sputtered target at RF Match Tune of 30-60% and RF Match Load of 45-85% with a RF Reflect Power of less than 1 W.

In order to reach an acceptable lithium concentration in the final buffer/cache layer, it was sometimes necessary to use simultaneous RF co-sputtering three-inch ceramic $Li_xM_yO_3$ and $Li_2CO_3$ targets. The delivered power for $Li_2CO_3$ target was 100-150 W. Alternatively, additional amount of $Li_2O$ may be sputtered above and below the $Li_xM_yO_3$ materials. This facilitates achieving a required Li:M stoichiometry after the lithium redistribution during the pseudocapacitor operation.

Obtaining the Solid-State Electrolyte Layer

The solid-state electrolyte layer (e) may be built by generally the same or similar methods, which are used in production of conventional TF-SS-LIBs.

In the TF-SS-PSC prototype production, the solid-state electrolyte layer (e) (150-1000 nm) was deposited by RF magnetron sputtering. Three-inch ceramic targets of 99.96 to 99.98% purity were sputtered in a mixed $Ar/O_2/N_2$ or $Ar/N_2$ atmosphere of 99.998% purity. The layer was grown up on top of the buffer/cache layer, with two-fold planetary rotation during deposition. Before start of the deposition, the chamber was pumped down to a base pressure below 1·10⁻⁸ Torr and the substrates were heated to a temperature of + 150 . . . +200° C. The total pressure was maintained between 2 and 15 mTorr during deposition. A RF power supply (R601 generator with MC2 automatic matching network controller, Seren IPS Inc., USA) was used to deliver 150-300 W to the sputtered target at RF Match Tune of 30-60% and RF Match Load of 45-85% with a RF Reflect Power of less than 1 W.

Symmetrical or asymmetrical combination of different types of solid-state electrolytes may be used to reach maximal Li⁺ ion conductivity and avoid some interface problems.

In the above description, the layers of the TF-SS-PSC prototype stack structures were deposited by magnetron sputtering. However, other suitable thin film deposition techniques may also be used in manufacturing the TF-SS-PSC. These techniques may include thermal sputtering, chemical vapor deposition, atomic layer deposition, e-beam deposition, pulse laser deposition, as well as different chemical methods like sol-gel techniques, chemical bath precipitation, ink-jet printing using proper inks, powder sintering, variety of galvanic methods, etc.

Characterization and Measurements

Elemental composition, phase composition, bond composition and oxidation grades of elements in each layer were characterized by X-ray Photoelectron Spectroscopy (XPS) (Phi Quantum 2000, Physical Electronics, Inc., USA), Scanning Electron Microscopy (SEM) (Quanta 200 and Sirion 200, FEI, Thermo Fisher Scientific, Inc., USA), high-resolution transmission electron microscopy (HRTEM) (JEM-2100F, JEOL Ltd., Japan) and X-ray diffraction (XRD) (X'Pert Pro, Philips N.V., Netherlands; Cu Kα, λ=0.1542 nm).

Thickness values of the layers were measured directly (SEM, FEI Quanta 200 and Sirion 200), and proved additionally using 3D Optical Surface Metrology System Leica DCM8, Leica Microsystems GmbH, Germany and Spectroscopic Ellipsometer M-2000D, J. A. Woollam Co, USA.

Figure 13:
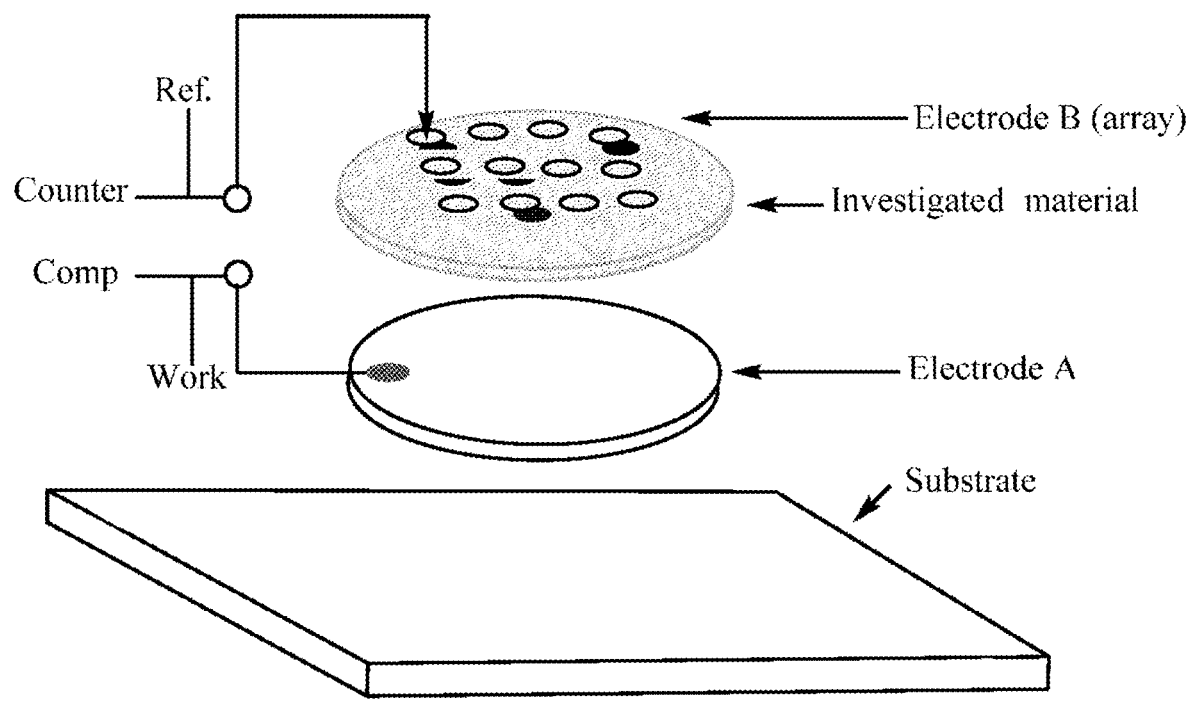
FIG. 13 illustrates test approach for measuring parameters of a TF-SS-PSC according to the invention.

Sheet resistance of the current collectors was measured using a 4-point probe (Jandel RM3000). Li+ and e– conductivity of Faradic layer materials, solid-state electrolytes and buffer/cache layer materials was measured and calculated using a sample stack comprising the investigated materials (FIG. 13) and potentiostat/galvanostat Elins P-40X equipped with EIS module FRA-24M. To minimize side effects, the reference electrode (A) was made with a large surface area and the measurement electrodes (B) were made with small surface areas. The measurements were conducted by a two-electrode connection. The measurement of the array of small electrodes (B) relative to the same reference electrode (A) provides enough method sensitivity to determine deviation in the material properties.

The sample layers were magnetron sputtered using masks of different shapes and sizes. Thickness of the investigated material was also important to obtain correct conductivity values. The array of the electrodes (B) was centered on the top surface of the investigated material with a reasonable gap to the material edge to avoid possible effect of additional electron injection from the neighbor metallic electrodes and some polarization problems. Gold was used as metal of the electrodes (A) and (B), which thickness was 200 nm. Surface area of each of the electrodes (B) was predetermined to facilitate conductivity calculation.

Weight of each layer and total weight of finished TF-SS-PSC samples were measured by a microbalance (Explorer EX124, OHAUS Corp., USA) with 0.1 mg accuracy.

Electrochemical tests of the samples were performed at room temperature using Reference ELINS P-40X/EIS FRA-24M potentiostat/galvanostat and combination of cyclic voltammetry, DC galvanostatic charge/discharge and impedance spectroscopy [22, 23]. Cyclic voltammetry was performed at scan rates in the range of 1 to 300 mV/s. Galvanostatic charge/discharge tests were performed at the voltage range of 0-4.2 V (0-5.0 V in some cases) and current density of 0.001-0.25 A/cm². Electrochemical impedance spectroscopy (EIS) was performed at 0.01-5.10⁵ Hz using AC voltage of 20-50 mV (rms). Specific capacitance was calculated based on both cyclic voltammetry data and galvanostatic charge/discharge curves. For cyclic voltammetry, specific capacitance was estimated by integrating the area under the current-potential curve and dividing by scan rate, mass of film electrode and the potential window according to the following expression:

$$C = \frac{1}{mv(V_a - V_c)} \int_{V_a}^{V_c} I(V)dV, \quad (1)$$

where C is the specific capacitance (F/g), m is mass of one layer or several stacked layers (g), v is the scan rate (V/s), $V_a$-$V_c$ represents the potential window (V), and I is either charge or discharge current (A). Capacitance values were calculated based on cyclic voltammetry data and based on charge/discharge curves, as test data may differ due to asymmetry of the TF-SS-PSC stack structure. Sometimes, it may be expedient to use only discharge current for capacity measurements of both asymmetric and symmetric TF-SS-PSCs.

In the galvanostatic charge/discharge measurements, capacitance was estimated based on the slope of the discharge curve according to the following expression:

$$C = \frac{I}{m\frac{dV}{dt}}, \quad (2)$$

where I is the discharge current (A) and t is the corresponding discharge time (s) from a starting voltage V (V).

The maximum energy E and power density P may be expressed as:

$$E = \frac{1}{2}\frac{CV^2}{m}, \quad (3)$$

$$P = \frac{V^2}{4R_s m}, \quad (4)$$

where $R_s$ is equivalent series resistance (ESR).

Potentiostatic measurement can be used in some cases. Some peak power characteristics such as impulse charge/discharge current can be estimated by this way.

Operational temperature range was checked by performing a series of tests of TF-SS-PSC samples at the following temperatures: −50, −40, −20, +25, +60, +100, +120 and +150° C. During the tests, it was discovered that the device capacity falls by only about 3 to 4 times at very low temperatures (−50 to −40° C.) compared to what is measured at +25° C. Moreover, the TF-SS-PSCs maintained their capability to receive charge at low temperature, which is usually applicable only for supercapacitors with liquid electrolyte, to the best of the inventor's knowledge. At the same time, leakage current at −20° C. and below was very small, so the TF-SS-PSCs may be stored in a charged state for a very long time (in about several weeks). Output power of the solid TF-SS-PSC samples was reduced about 3-4 times at −20° C. and below, while other features (OCV, TV, etc.) deteriorated insignificantly.

At high temperatures (+100 to +150° C.), measured capacity and power were increased by about 3 to 4 times compared to that measured at +25° C. Leakage current turned out to be rather high, but still satisfactory. Discharge tests for relevant loads revealed that the TF-SS-PSCs were able to operate at the extreme positive temperatures providing required voltage and current during 3-15 hours. The inventors have discovered that degradation the TF-SS-PSC operational parameters was not significant and was primarily caused by physical defects appeared during deposition of the stack layers. These negative effects may be avoided in mass production by further improvement of deposition technology and by using substrates having more uniform and smooth surface.

The above-indicated measurements and calculations yielded quite high parameters of the tested TF-SS-PSC prototype samples:

OCV was 2.4-5.0 V per cell;

maximum charge voltage was up to 20 V per cell;

maximum charge current was more than 0.25 A/cm²;

discharge curve was flat with more than 90% capacity located in a useful voltage band;

specific energy was 5 to 12 Wh/kg for FIGS. 8A and 8B devices;

specific energy was 0.2 to 2 Wh/kg for FIGS. 9A and 9B devices;

power density was 2 to 5 kW/kg for FIGS. 8A and 8B devices;

power density was 2 to 6 kW/kg for FIGS. 9A and 9B devices;

lifetime was more than 100,000 cycles;

ESR was in the range of 2-8 Ohm/cm² for FIGS. 8A and 8B devices;

ESR was in the range of 0.5-1.5 Ohm/cm² for FIGS. 9A and 9B devices;

operational temperature range was −50 to +150° C.

EXAMPLES

Description of examples of AS-TF-SS-PSC and SY-TF-SS-PSC samples built by the inventors during prototyping is further provided to illustrate the technical result.

Example 1

An AS-TF-SS-PSC sample having structure as shown in FIG. 8A with dimensions of 30×30 mm was built on a Si/SiO$_2$ substrate using a sputtered 250 nm titanium layer as a bottom and top current collectors. The sample was manufactured using the above-indicated technology; two buffer/cache layers having thickness of 20 nm were made of $Li_{0.8}Ta_{1.2}O_3$. Faradic layer $WO_{2.4}$:Al:N:C (500 nm) was sputtered from three targets, W, Al and Graphite, in Ar/O$_2$/N$_2$ atmosphere by PDC reactive magnetron co-sputtering. Solid state electrolyte layer (400 nm) was RF sputtered from a Li$_3$PO$_4$ target in pure N$_2$ atmosphere at +150° C. The sputtered sample was annealed at 200-250° C. in nitrogen atmosphere. The final device was laminated by the same material as used for pouch Li-ion battery production to avoid contact with environment. Measurements were performed according to the above-described methods. The sample had OCV of 2.9 V and ESR of 26 Ohm for 9 cm² sample and was operational in the temperature range of −50 to +150° C.; specific energy was 5.0 Wh/kg; power density was 2.0 kW/kg.

Example 2

An AS-TF-SS-PSC sample having structure as shown in FIG. 8A with dimensions of 30×30 mm was built on a Si/SiO$_2$ substrate using a sputtered 250 nm titanium layer as bottom and top current collectors. The sample was manufactured using the above-described technology; two buffer/cache layers having thickness of 20 nm were made of $Li_{1.0}Ta_{1.0}O_3$. Faradic layer $WO_{2.4}$:Al:N:C (500 nm) was sputtered from three targets, W, Al and Graphite, in Ar/O$_2$/N$_2$ atmosphere by PDC reactive magnetron co-sputtering. Solid state electrolyte layer (400 nm) was RF sputtered from a Li$_3$PO$_4$ target in pure N$_2$ atmosphere at +150° C. The sputtered sample was annealed at 200-250° C. in nitrogen atmosphere. The final device was laminated by the same material as for pouch Li-ion battery production to avoid contact with environment. Measurements were performed according to the above-described methods. The sample had OCV of 3.1 V and ESR of 21 Ohm for 9 cm² sample and was operational in the temperature range of −50 to +150° C.; specific energy was 8 Wh/kg; power density was 2.5 kW/kg.

Example 3

An AS-TF-SS-PSC sample having structure as shown in FIG. 8A with dimensions of 30×30 mm was built on a Si/SiO$_2$ substrate using a sputtered 250 nm titanium layer as a bottom and top current collectors. The sample was manufactured using the above-described technology; two buffer/cache layers having thickness of 20 nm were made of $Li_{1.4}Ta_{1.0}O_3$. Faradic layer $WO_{2.4}$:Al:N:C (500 nm) was sputtered from three targets, W, Al and Graphite, in Ar/O2/N2 atmosphere by PDC reactive magnetron co-sputtering. Solid state electrolyte layer (400 nm) was RF sputtered from a Li₃PO₄ target in pure N$_2$ atmosphere at +150° C. The sputtered sample was annealed at 200-250° C. in nitrogen atmosphere. The final device was laminated by the same material as that used for pouch Li-ion battery production to avoid contact with environment. Measurements were performed according to the above-described methods. The sample had OCV of 3.3 V and ESR of 18 Ohm for 9 cm² sample and was operational in the temperature range of −50 to +150° C.; specific energy was 7 Wh/kg; power density was 2.9 kW/kg.

Example 4

An AS-TF-SS-PSC sample having structure as shown in FIG. 8A with dimensions of 30×30 mm was built on a Si/SiO$_2$ substrate using a sputtered 250 nm titanium layer as a bottom and top current collectors. The sample was manufactured using the above-indicated technology; two buffer/cache layers having thickness of 15 nm were made of Li$_{0.8}$Ta$_{0.8}$O$_3$. Faradic layer WO$_{2.4}$:Al:N:C (500 nm) was sputtered from three targets, W, Al and Graphite, in Ar/O2/N2 atmosphere by PDC reactive magnetron co-sputtering. Solid state electrolyte layer (400 nm) was RF sputtered from a Li$_3$PO$_4$ target in pure N$_2$ atmosphere at +150° C. The sputtered sample was annealed at 200-250° C. in nitrogen atmosphere. The final device was laminated by the same material as used for pouch Li-ion battery production to avoid contact with environment. Measurements were performed according to the above-described methods. The sample had OCV of 3.3 V and ESR of 27 Ohm for 9 cm² sample and was operational in the temperature range of −50 to +150° C.; specific energy was 5 Wh/kg; power density was 2.5 kW/kg.

Example 5

An AS-TF-SS-PSC sample having structure as shown in FIG. 8A with dimensions of 30×30 mm was built on a Si/SiO$_2$ substrate using a sputtered 250 nm titanium layer as a bottom and top current collectors. The sample was manufactured using the above-indicated technology; two buffer/cache layers having thickness of 15 nm were made of Li$_{1.4}$Ta$_{1.2}$O$_3$. Faradic layer WO$_{2.4}$:Al:N:C (500 nm) was sputtered from three targets, W, Al and Graphite, in Ar/O2/N2 atmosphere by PDC reactive magnetron co-sputtering. Solid state electrolyte layer (400 nm) was RF sputtered from a Li$_3$PO$_4$ target in pure N$_2$ atmosphere at +150° C. The sputtered sample was annealed at 200-250° C. in nitrogen atmosphere. The final device was laminated by the same material as that used for pouch Li-ion battery production to avoid contact with environment. Measurements were performed according to the above-described methods. The sample had OCV of 3.3 V and ESR of 16 Ohm for 9 cm² sample and was operational in the temperature range of −50 to +150° C.; specific energy was 10 Wh/kg; power density was 2.8 kW/kg.

Example 6

An AS-TF-SS-PSC sample having structure as shown in FIG. 8A with dimensions of 30×30 mm was built on a Si/SiO$_2$ substrate using a sputtered 250 nm titanium layer as a bottom and top current collectors. The sample was manufactured using the above-indicated technology; two buffer/cache layers having thickness of 15 nm were made of Li$_{0.8}$V$_{1.0}$O$_3$. Faradic layer WO$_{2.4}$:Al:N:C (500 nm) was sputtered from three targets, W, Al and Graphite, in Ar/O2/N2 atmosphere by PDC reactive magnetron co-sputtering. Solid state electrolyte layer (400 nm) was RF sputtered from a Li$_3$PO$_4$ target in pure N$_2$ atmosphere at +150° C. The sputtered sample was annealed at 200-250° C. in nitrogen atmosphere. The final device was laminated by the same material as that used for pouch Li-ion battery production to avoid contact with environment. Measurements were performed according to the above-described methods. The sample had OCV of 3.3 V and ESR of 25 Ohm for 9 cm² sample and was operational in the temperature range of −50 to +150° C.; specific energy was 6 Wh/kg; power density was 2.0 kW/kg.

Example 7

An AS-TF-SS-PSC sample having structure as shown in FIG. 8A with dimensions of 30×30 mm was built on a Si/SiO$_2$ substrate using a sputtered 250 nm titanium layer as a bottom and top current collectors. The sample was manufactured using the above-indicated technology; two buffer/cache layers having thickness of 15 nm were made of Li$_{1.4}$V$_{1.0}$O$_3$. Faradic layer WO$_{2.4}$:Al:N:C (500 nm) was sputtered from three targets, W, Al and Graphite, in Ar/O2/N2 atmosphere by PDC reactive magnetron co-sputtering. Solid state electrolyte layer (400 nm) was RF sputtered from a Li$_3$PO$_4$ target in pure N$_2$ atmosphere at +150° C. The sputtered sample was annealed at 200-250° C. in nitrogen atmosphere. The final device was laminated by the same material as that used for pouch Li-ion battery production to avoid contact with environment. Measurements were performed according to the above-described methods. The sample had OCV of 3.3 V and ESR of 17 Ohm for 9 cm² sample and was operational in the temperature range of −50 to +150° C.; specific energy was 8.0 Wh/kg; power density was 2.8 kW/kg.

Example 8

An AS-TF-SS-PSC sample having structure as shown in FIG. 8A with dimensions of 40×40 mm was built on a Si/SiO$_2$ substrate using a sputtered 250 nm titanium layer as a bottom and top current collectors. The sample was manufactured using the above-indicated technology; two buffer/cache layers having thickness of 25 nm were made of Li$_{1.2}$Ta$_{1.0}$O$_3$. Faradic layer WO$_{2.6}$:Al:Si:N:C (1000 nm) was sputtered by PDC reactive magnetron co-sputtering from four targets W, Al, Si and Graphite in Ar/O$_2$/N$_2$ atmosphere. The Faradic layer was pre-intercalated by Li⁺ ion insertion in a liquid cell by ¼C from its maximal capacity towards lithium. Then "thermo-split" of the Faradic layer was performed at +400° C. in a muffle furnace. Solid state electrolyte layer (400 nm) was RF sputtered from a Li$_3$PO$_4$ target in pure N$_2$ atmosphere at +150° C. The sputtered sample was annealed at +200° C. in nitrogen atmosphere. The final device was temporary laminated by silicone two component compound to avoid contact with environment. Measurements were performed according to the above-described methods. The sample had OCV of 3.3 V and ESR of 40 Ohm for 16 cm² sample and was operational in the temperature range of −50 to +150° C.; specific energy was 10.0 Wh/kg; power density was 3.3 kW/kg.

Example 9

An AS-TF-SS-PSC sample having structure as shown in FIG. 8A with dimensions of 40×40 mm was built on a Si/SiO$_2$ substrate using a sputtered 250 nm titanium layer as a bottom and top current collectors. The sample was manufactured using the above-indicated technology; two buffer/cache layers having thickness of 25 nm were made of $Li_{1.2}Ta_{1.0}O_3$. Faradic layer $WO_{2.9}$:Al:Si:N:C (1000 nm) was sputtered by PDC reactive magnetron co-sputtering from four targets W, Al, Si and Graphite in $Ar/O_2/N_2$ atmosphere. The Faradic layer was pre-intercalated by $Li^+$ ion insertion in a liquid cell by ¼C from its maximal capacity towards lithium. Then "thermo-split" of the Faradic layer was performed at +400° C. in muffle furnace. Solid state electrolyte layer (400 nm) was RF sputtered from a $Li_3PO_4$ target in pure $N_2$ atmosphere at +150° C. The sputtered stack was annealed at +200° C. in nitrogen atmosphere. The final device was temporary laminated by silicone two component compound to avoid contact with environment. Measurements were performed according to the above-described methods. The sample had OCV of 3.3 V and ESR of 45 Ohm for 16 $cm^2$ sample and was operational in the temperature range of −50 to +150° C.; specific energy was 8.0 Wh/kg; power density was 2.8 kW/kg.

Example 10

An AS-TF-SS-PSC sample having structure as shown in FIG. 8A with dimensions of 40×40 mm was built on a glass/ITO substrate using a sputtered 250 nm titanium layer as a top current collectors. The sample was manufactured using the above-indicated technology; two buffer/cache layers with some asymmetrical thicknesses (15 nm near to Faradic layer and 50 nm near to the top Ti current collector) were made of $Li_{1.2}Ta_{1.0}O_3$. Faradic layer $WO_{2.4}$:Cr:Ti:Ge:N:H:C (1000 nm) was sputtered by PDC reactive magnetron co-sputtering from four targets W, CrC, Ti and Ge in $Ar/O_2/N_2/H_2$ atmosphere. The Faradic layer was pre-intercalated by $Li^+$ ion insertion in a liquid cell by ¼C from its maximal capacity towards lithium. Then "thermo-split" of the Faradic layer was performed at +400° C. in muffle furnace. Solid state electrolyte layer (400 nm) was RF sputtered from a $Li_3PO_4$ target in pure $N_2$ atmosphere at +150° C. The sputtered sample was annealed at +200° C. in nitrogen atmosphere. The final device was temporary laminated by silicone two component compound to avoid contact with environment. Measurements were performed according to the above-described methods. The sample had OCV of 3.3 V and ESR of 32 Ohm for 16 $cm^2$ sample and was operational in the temperature range of −50 to +150° C.; specific energy was 10.0 Wh/kg; power density was 4.8 kW/kg.

Example 11

An AS-TF-SS-PSC sample having structure as shown in FIG. 8A with dimensions of 40×40 mm was built on a glass/ITO substrate using a sputtered 250 nm titanium layer as a top current collectors. The sample was manufactured using the above-indicated technology; two buffer/cache layers with some asymmetrical thicknesses (25 nm near to Faradic layer and 50 nm near to the top Ti current collector) were made of $Li_{1.2}Ta_{1.0}O_3$. Faradic layer $WO_{2.6}$:Mo:Mn:B:N:H:C (1000 nm) was sputtered by PDC reactive magnetron co-sputtering from four targets WC, Mo, Mn—C (composite target) and B—C(composite target) in $Ar/O_2/NH_3/H_2$ atmosphere. The Faradic layer was pre-intercalated by $Li^+$ ion insertion in a liquid cell by ¼C from its maximal capacity towards lithium. Then "thermo-split" of the Faradic layer was performed at +400° C. in muffle furnace (as described in material section). Solid state electrolyte layer (400 nm) was RF sputtered from a $Li_3PO_4$ target in pure $N_2$ atmosphere at +150° C. The sputtered sample was annealed at +200° C. in nitrogen atmosphere. The final device was temporary laminated by silicone two component compound to avoid contact with environment. Measurements were performed according to the above-described methods. The sample had OCV of 3.0 V and ESR of 32 Ohm for 16 $cm^2$ sample and was operational in the temperature range of −50 to +150° C.; specific energy was 9.0 Wh/kg; power density was 4.6 kW/kg.

Example 12

An AS-TF-SS-PSC sample having structure as shown in FIG. 8A with dimensions of 40×40 mm was built on a glass/ITO substrate using a sputtered 250 nm titanium layer as a top current collectors. The sample was manufactured using the above-indicated technology; two buffer/cache layers with some asymmetrical thicknesses (15 nm near to Faradic layer and 50 nm near to the top Ti current collector) were made of $Li_{1.2}Nb_{1.0}O_3$. Faradic layer $WO_{2.6}$:Mo:Mn:B:N:H:C (1000 nm) was sputtered by PDC reactive magnetron co-sputtering from four targets WC, Mo, Mn—C (composite target) and B—C(composite target) in $Ar/O_2/NH_3/H_2$ atmosphere. The Faradic layer was pre-intercalated by $Li^+$ ion insertion in a liquid cell by ¼C from its maximal capacity towards lithium. Then "thermo-split" of the Faradic layer was performed at +400° C. in muffle furnace (as described in material section). Solid state electrolyte layer (400 nm) was RF sputtered from a $Li_3PO_4$ target in pure $N_2$ atmosphere at +150° C. The sputtered sample was annealed at +200° C. in nitrogen atmosphere. The final device was temporary laminated by silicone two component compound to avoid contact with environment. Measurements were performed according to the above-described methods. The sample had OCV of 3.0 V and ESR of 64 Ohm for 16 $cm^2$ sample and was operational in the temperature range of −50 to +150° C.; specific energy was 9.0 Wh/kg; power density was 2.6 kW/kg.

Example 13

An AS-TF-SS-PSC sample having structure as shown in FIG. 8A with dimensions of 40×40 mm was built on a glass/ITO substrate using a sputtered 250 nm titanium layer as a top current collectors. The sample was manufactured using the above-indicated technology; two buffer/cache layers with thicknesses 15 nm were made of $Li_{1.2}Nb_{1.0}O_3$. Faradic layer $WO_{2.6}$:Ni:V:P:N:H:C (1000 nm) was sputtered by PDC reactive magnetron co-sputtering from three targets W, NiV7 and P—C(composite target) in $Ar/O_2/CO/N_2$ atmosphere. The Faradic layer was pre-intercalated by $Li^+$ ion insertion in a liquid cell by ¼C from its maximal capacity towards lithium. Then "thermo-split" of the Faradic layer was performed at +400° C. in muffle furnace (as described in material section). Solid state electrolyte layer (400 nm) was RF sputtered from a $Li_3PO_4$ target in pure $N_2$ atmosphere at +150° C. The sputtered sample was annealed at +200° C. in nitrogen atmosphere. The final device was temporary laminated by silicone two component compound to avoid contact with environment. Measurements were performed according to the above-described methods. The sample had OCV of 3.0 V and ESR of 32 Ohm for 16 $cm^2$ sample and was operational in the temperature range of −50 to +150° C.; specific energy was 12.0 Wh/kg; power density was 4.9 kW/kg.

Example 14

An SY-TF-SS-PSC sample having structure as shown in FIG. 8B with dimensions of 40×40 mm was built on a glass/ITO substrate using a sputtered 250 nm titanium layer as a top current collectors. The sample was manufactured using the above-indicated technology; two buffer/cache layers with thicknesses 15 nm were made of $Li_{1.2}V_{1.0}O_3$. Two symmetrical Faradic layers $WO_{2.6}$:Ti:N:C (500 nm) were sputtered by PDC reactive magnetron co-sputtering from three targets W, Ti and Graphite in $Ar/O_2/N_2$ atmosphere. Some amount of $Li_2O$ (5-10 nm) was sputtered from $Li_2CO_3$ target on the top of each buffer/cache layers. Solid state electrolyte layer (400 nm) was RF sputtered from lithium enriched $Li_{3.5}PO_{2.5}$ target in pure $N_2$ atmosphere at +150° C. The sputtered sample was annealed at +200° C. in nitrogen atmosphere. The final device was laminated by silicone two component compound to avoid contact with environment. Measurements were performed according to the above-described methods. The sample had OCV of 2.4 V and ESR of 128 Ohm for 16 cm² sample and was operational in the temperature range of −50 to +150° C.; specific energy was 6.0 Wh/kg; power density was 2.0 kW/kg.

Example 15

An SY-TF-SS-PSC sample having structure as shown in FIG. 8B with dimensions of 40×40 mm was built on a $Si/SiO_2$ substrate using a sputtered 250 nm Mo layer as a bottom and top current collectors. The sample was manufactured using the above-indicated technology; two buffer/cache layers with thicknesses 50 nm were made of $Li_{0.8}Ta_{1.4}O_3$. Two symmetrical Faradic layers $WO_{2.6}$:Ti:N:C (500 nm) were sputtered by PDC reactive magnetron co-sputtering from three targets W, Ti and Graphite in $Ar/O_2/N_2$ atmosphere. Some amount of $Li_2O$ (5-10 nm) was sputtered from $Li_2CO_3$ target on the top of each buffer/cache layers. Solid state electrolyte layer (400 nm) was RF sputtered from lithium enriched $Li_{3.5}PO_{2.5}$ target in pure $N_2$ atmosphere at +150° C. The sputtered sample was annealed at +200° C. in nitrogen atmosphere. The final device was laminated by silicone two component compound to avoid contact with environment. Measurements were performed according to the above-described methods. The sample had OCV of 2.6 V and ESR of 110 Ohm for 16 cm² sample and was operational in the temperature range of −50 to +150° C.; specific energy was 7.0 Wh/kg; power density was 2.5 kW/kg.

Example 16

An AS-TF-SS-PSC sample having structure as shown in FIG. 8B with dimensions of 40×40 mm was built on a $Si/SiO_2$ substrate using a sputtered 250 nm Mo layer as a bottom and top current collectors. The sample was manufactured using the above-indicated technology; two buffer/cache layers with thicknesses 50 nm were made of $Li_{1.2}Ta_{1.0}O_3$. Two symmetrical Faradic layers $WO_{2.6}$:Co:Al:N:C (1000 nm) were sputtered by PDC reactive magnetron co-sputtering from four targets W, Co, Al and Graphite in $Ar/O_2/N_2$ atmosphere. Some amount of $Li_2O$ (10-15 nm) was sputtered from $Li_2CO_3$ target on the top of upper buffer/cache layers. Solid state electrolyte layer (400 nm) was RF sputtered from lithium enriched $Li_{3.5}PO_{2.5}$ target in pure $N_2$ atmosphere at +150° C. The sputtered sample was annealed at +200° C. in nitrogen atmosphere. The final device was laminated by silicone two component compound to avoid contact with environment. Measurements were performed according to the above-described methods. The sample had OCV of 2.4 V and ESR of 130 Ohm for 16 cm² sample and was operational in the temperature range of −50 to +150° C.; specific energy was 8.0 Wh/kg; power density was 3.1 kW/kg.

Example 17

A simplified SY-TF-SS-PSC sample having structure as shown in FIG. 9A with dimensions of 30×30 mm was built on a $Si/SiO_2$ substrate using a sputtered 250 nm NiCr layer as a bottom and top current collectors. The sample was manufactured using the above-indicated technology; two buffer/cache layers with thicknesses 150 nm were made of $Li_{1.2}Ta_{1.0}O_3$. Solid state electrolyte layer (500 nm) was RF sputtered from $Li_3PO_4$ target in pure $N_2$ atmosphere at +150° C. The sputtered sample was annealed at +200° C. in nitrogen atmosphere. The final device was laminated by silicone two component compound to avoid contact with environment. Measurements were performed according to the above-described methods. The sample had OCV of 5.0 V and ESR of 8 Ohm for 9 cm² sample and was operational in the temperature range of −50 to +150° C.; specific energy was 0.5 Wh/kg; power density was 3.0 kW/kg.

Example 18

A simplified SY-TF-SS-PSC sample having structure as shown in FIG. 9B with dimensions of 30×30 mm was built on a $Si/SiO_2$ substrate using a sputtered 250 nm NiCr layer as a bottom and top current collectors. The buffer/cache layer of $Li_{1.2}Ta_{0.8}O_3$ was sputtered between two current collectors with thicknesses 1000 nm. The sputtered sample was annealed at +200° C. in argon atmosphere. The final device was laminated by silicone two component compound to avoid contact with environment. Measurements were performed according to the above-described methods. The sample had OCV of 5.0 V and ESR of 1.5 Ohm for 9 cm² sample and was operational in the temperature range of −50 to +150° C.; specific energy was 1.5 Wh/kg; power density was 6.0 kW/kg.

Thus, as lithium content increases in the buffer/cache layer of the AS-TF-SS-PSC, the specific capacity increases slightly, while the power density increases more noticeably. Furthermore, lithium concentration proportionally influences electron conductivity of the buffer/cache materials, which has negative influence on the device ESR due to change in the above-mentioned "wave-like" mechanism and increase in the lithium diffusion, and also due to decrease in additional resistance of the solid-state electrolyte or the buffer/cache layer. Furthermore, in view of buffer/cache layer peculiarities, some common measurement techniques for ESR (AC) may give incorrect (too high) values.

It should be understood that sequence of steps in the method description provided herein is illustrative only and it may be different in some embodiments of the invention, as long as the function is maintained and the result is attained.

Parts and features of the invention may be combined in different embodiments of the invention, if they do not contradict to each other. The embodiments of the invention disclosed in the above are provided as illustrations and they are not intended to limit the invention as defined in claims. All and any reasonable modifications, alterations, and equivalent replacements in design, configuration, and principle of operation are included into scope of the invention.

Terms and Abbreviations

TF means "thin film".

SS means "solid-state"; it also means "all-solid-state" when related to this invention.

SC means "supercapacitor".

PSC means "pseudo-supercapacitor".

LIB means "lithium ion battery".

EDLC means "electrical double layer capacitor".

OCV means "open-circuit voltage", a voltage between terminals of a power source with no load connected; OCV depends on the power source charge.

TV means terminal voltage, a voltage between terminals of a power source with a connected load; TV depends on the power source charge and load current.

IR means "internal resistance", an active resistance within a power source, which is generally different for charging and discharging processes; it also depends on the power source charge status; with high internal resistance, the power source is less effective and its thermal stability is reduced as greater portion of the stored energy is converted into heat.

ESR means "equivalent series resistance"; its value depends on frequency and is defined as $$ESR_F = \frac{\Delta V}{\Delta I},$$

where F is frequency, $\Delta V$ is a power source voltage drop at the beginning of discharge process, and $\Delta I$ is difference between charge current and discharge current; ESR causes power loss and it must be as low as possible for the best power sources.

Cut-off voltage is a minimum allowable voltage; it generally defines the allowable "empty" state of a power source.

Capacity is a main coulometric parameter of a power source; it is equal to total charge (A·h) available when the power source is discharged at a certain discharge current (specified as a C-rate) from 100% charge to the cut-off voltage.

Lifetime is a number of charge/discharge cycles, which a power source may stand before it fails to meet specific performance criteria; lifetime is affected by rate and depth of cycling, charge and discharge current value, operational temperature, radiation, humidity, etc.; therefore lifetime is estimated for predetermined operational conditions.

Shelf life is a period of storage time between charging; it is limited by self-discharge processes, leakage current and by inner material degradation processes, e.g., shelf life of conventional pouch LIBs is limited to a few years due to degradation.

Specific energy is a nominal power source energy per unit mass (Wh/kg); sometimes specific energy is referred to as gravimetric energy density.

Specific power is maximum available power per unit mass (W/kg); it determines the power source weight necessary to provide a required power to a load; sometimes specific power is referred to as power density.

Maximum continuous discharge current is maximum current at which the power source may be discharged continuously; this limit is usually defined by the power source manufacturer in order to prevent excessive discharge rates that would damage the power source or reduce its capacity and/or lifetime.

Maximum charge voltage is maximum voltage of a fully charged power source; a charging scheme generally consists of a constant current charging step until the power source voltage reaches the maximum charge voltage, and a constant voltage charging step allowing the charge current to taper to a very small value.

Maximum charge current is maximum current with which a power source is initially charged during constant current charging step prior to transition to constant voltage charging step.

Having thus described preferred embodiments, it should be apparent to those skilled in the art that certain advantages of the described device and method have been achieved. It should also be appreciated that various modifications, adaptations, and alternative embodiments thereof may be made within the scope and spirit of the present invention, which is defined by the following claims.

REFERENCES

1. Obrovac, M. N. & Chevrier, V. L., *Alloy negative electrodes for Li-ion batteries*, Chem. Rev. 114, 11444-11502 (2014).
2. *Lithium Batteries*, (John Wiley & Sons, Inc., 2013). doi:10.1002/9781118615515
3. IDTechEx. Infinite Power Solutions, Inc. (2011). Available at: www.idtechex.com/research/articles/infinite-power-solutions-surges-forward-with-new-products-00003887.asp?donotredirect=true.
4. Conway, B. E., *Electrochemical Supercapacitors: Scientific Fundamentals and Technological Applications*, (Springer US, 1999). doi: 10.1007/978-1-4757-3058-6
5. Kim, M. & Kim, J., *Development of high power and energy density microsphere silicon carbide-$MnO_2$ nanoneedles and thermally oxidized activated carbon asymmetric electrochemical supercapacitors*, Phys. Chem. Chem. Phys. 16, 11323 (2014).
6. Chen, W., $MnO_2$ *Based Nanostructures for Supercapacitor Energy Storage Applications Dissertation* (2013).
7. Lv, Q. et al., *Solid-State Thin-Film Supercapacitors with Ultrafast Charge/Discharge Based on N-Doped-Carbon-Tubes/Au-Nanoparticles-Doped-$MnO_2$ Nanocomposites*, Nano Lett. 16, 40-47 (2016).
8. Liu, T.-T., Shao, G.-J., Ji, M.-T. & Ma, Z.-P., *Research Progress in Nano-Structured $MnO_2$ as Electrode Materials for Supercapacitors*, Asian J. Chem. 25, 7065-7070 (2013).
9. Lamberti, A., Fontana, M., Bianco, S. & Tresso, E., *Flexible solid-state $Cu_xO$-based pseudo-supercapacitor by thermal oxidation of copper foils*, Int. J. Hydrogen Energy 41, 11700-11708 (2016).
10. Gao, H. et al., *Solid-state electric double layer capacitors for ac line-filtering*, Energy Storage Mater. 4, 66-70 (2016).
11. Yang, C. C., Hsu, S. T. & Chien, W. C., *All solid-state electric double-layer capacitors based on alkaline polyvinyl alcohol polymer electrolytes*, J. Power Sources 152, 303-310 (2005).
12. Sato, T. et al., *High voltage electric double layer capacitor using a novel solid-state polymer electrolyte*, J. Power Sources 295, 108-116 (2015).
13. Yoon, Y. S., Cho, W. I., Lim, J. H. & Choi, D. J., *Solid-state thin-film supercapacitor with ruthenium oxide and solid electrolyte thin films*, J. Power Sources 101, 126-129 (2001).
14. Goodenough, P. I. J. B., *Good Solid Electrolytes for Next Generation Batteries*, 1-18 (2012).

15. Le Van-Jodin, L., Ducroquet, F., Sabary, F. & Chevalier, I., *Dielectric properties, conductivity and Li+ ion motion in LiPON thin films*, Solid State Ionics 253, 151-156 (2013).
16. Carlberg, J. C., *Poly(3,4-ethylenedioxythiophene) as Electrode Material in Electrochemical Capacitors*, J. Electrochem. Soc. 144, L61 (1997).
17. Liu, Y. et al., *High-Performance Flexible All-Solid-State Supercapacitor from Large Free-Standing Graphene-PEDOT/PSS Films*, Sci. Rep. 5, 17045 (2015).
18. Wen, R. T., Granqvist, C. G. & Niklasson, G. A., *Eliminating degradation and uncovering ion-trapping dynamics in electrochromic $WO_3$ thin films*, Nat. Mater. 14, 996-1001 (2015).
19. Wen, R. T., Arvizu, M. A., Morales-Luna, M., Granqvist, C. G. & Niklasson, G. A., *Ion Trapping and Detrapping in Amorphous Tungsten Oxide Thin Films Observed by Real-Time Electro-Optical Monitoring*, Chem. Mater. 28, 4670-4676 (2016).
20. Inrermolecular Inc, Available at: http://intermolecular.com/.
21. Guillén, C. & Herrero, J., *TCO/metal/TCO structures for energy and flexible electronics*, Thin Solid Films 520, 1-17 (2011).
22. Huang, C. & Grant, P. S., *One-step spray processing of high power all-solid-state supercapacitors*, Sci. Rep. 3, 2393 (2013).
23. Taberna, P. L., Simon, P. & Fauvarque, J. F., *Electrochemical Characteristics and Impedance Spectroscopy Studies of Carbon-Carbon Supercapacitors*, J. Electrochem. Soc. 150, A292 (2003).

What is claimed is:

1. An electrochemical power source comprising:
    a substrate;
    a first current collector layer on the substrate;
    a first buffer/cache layer on the first current collector layer, wherein the first buffer/cache layer accumulates energy;
    a solid-state electrolyte layer on the first buffer/cache layer;
    a second buffer/cache layer on the solid-state electrolyte layer, wherein the second buffer/cache layer accumulates energy;
    a second current collector layer on the second buffer/cache layer,
    wherein each of the buffer/cache layers is formed of $Li_XM_YO_3$,
    wherein
    M is any of Nb, Ta, Ti, V,
    X is in a range of 0.8 to 1.4, and
    Y is in a range of 1.2 to 0.6.

2. The power source of claim 1, further comprising an outer protective layer above the second collector layer.

3. The power source of claim 1, wherein a thickness of each of the buffer/cache layers is in a range of 15 to 1000 nm.

4. The power source of claim 1, wherein each layer is a thin film.

5. The power source of claim 1, wherein the solid-state electrolyte layer is an all-solid-state electrolyte layer.

6. The power source of claim 1, further comprising at least one Faradaic layer between the first current collector layer and the first buffer/cache layer and/or between the second current collector layer and the second buffer/cache layer.

7. The power source of claim 6, wherein the Faradaic layer is formed of $WO_{2.4-2.9}$:M1:M2:E1:E2:E3,
    wherein
    M1 is a dopant element selected from Mo, Ti, Ni, V, Cr, Al, Nb, Ta, Co, Mn,
    M2 is a dopant element selected from Mo, Ti, Ni, V, Cr, Al, Nb, Ta, Co, Mn,
    E1 is a dopant element selected from H, N, C, Si, Ge, P, B,
    E2 is a dopant element selected from H, N, C, Si, Ge, P, B,
    E3 is a dopant element selected from H, N, C, Si, Ge, P, B, and
    M1 differs from M2 and E1, E2, E3 differ from each other.

8. The power source of claim 6, wherein the Faradaic layer is formed of $MoO_{2.4-2.9}$:M1:M2:E1:E2:E3,
    wherein
    M1 is a dopant element selected from Ti, Ni, V, Cr, Al, Nb, Ta, Co, Mn,
    M2 is a dopant element selected from Ti, Ni, V, Cr, Al, Nb, Ta, Co, Mn,
    E1 is a dopant element selected from H, N, C, Si, Ge, P, B,
    E2 is a dopant element selected from H, N, C, Si, Ge, P, B,
    E3 is a dopant element selected from H, N, C, Si, Ge, P, B, and
    M1 differs from M2 and E1, E2, E3 differ from each other.

9. The power source of claim 6, wherein a thickness of the Faradaic layer is in a range of 100 to 1000 nm.

10. The power source of claim 1, wherein the first buffer/cache layer and/or the second buffer/cache layer provides protection against overcharging and/or discharging below a cut-off voltage.

11. A method of manufacturing an electrochemical power source, the method comprising:
    forming a first current collector layer on a substrate;
    forming a first buffer/cache layer on the first current collector layer, wherein the first buffer/cache layer accumulates energy;
    forming a solid-state electrolyte layer on the first buffer/cache layer;
    forming a second buffer/cache layer on the solid-state electrolyte layer, wherein the second buffer/cache layer accumulates energy;
    forming a second current collector layer on the second buffer/cache layer,
    wherein each of the two buffer/cache layers is formed of $Li_XM_YO_3$,
    wherein
    M is any of Nb, Ta, Ti, V,
    X is in a range of 0.8 to 1.4, and
    Y is in a range of 1.2 to 0.6.

12. The method of claim 11, wherein the first buffer/cache layer and/or the second buffer/cache layer provides protection against overcharging and/or discharging below a cut-off voltage.

13. The method of claim 12, further including forming an outer protective layer above the second collector layer.

14. The method claim 12, wherein a thickness of each of the buffer/cache layers is in the range of 15 to 1000 nm.

15. The method of claim 11, wherein each layer is a thin film.

16. The method of manufacturing an electrochemical power source of claim 11, wherein the solid-state electrolyte layer is an all-solid-state electrolyte layer.

17. The method of claim 11, further including forming at least one Faradaic layer between the first current collector layer and the first buffer/cache layer and/or between the second current collector layer and the second buffer/cache layer.

18. The method of claim 17, wherein the Faradaic layer is formed of $WO_{2.4\text{-}2.9}$:M1:M2:E1:E2:E3, wherein M1 is a dopant element selected from Mo, Ti, Ni, V, Cr, Al, Nb, Ta, Co, Mn, M2 is a dopant element selected from Mo, Ti, Ni, V, Cr, Al, Nb, Ta, Co, Mn, E1 is a dopant element selected from H, N, C, Si, Ge, P, B, E2 is a dopant element selected from H, N, C, Si, Ge, P, B, E3 is a dopant element selected from H, N, C, Si, Ge, P, B, and M1 differs from M2 and E1, E2, E3 differ from each other.

19. The method of claim 17, wherein the Faradaic layer is formed of $MoO_{2.4\text{-}2.9}$:M1:M2:E1:E2:E3, wherein M1 is a dopant element selected from Ti, Ni, V, Cr, Al, Nb, Ta, Co, Mn, M2 is a dopant element selected from Ti, Ni, V, Cr, Al, Nb, Ta, Co, Mn, E1 is a dopant element selected from H, N, C, Si, Ge, P, B, E2 is a dopant element selected from H, N, C, Si, Ge, P, B, E3 is a dopant element selected from H, N, C, Si, Ge, P, B, and M1 differs from M2 and E1, E2, E3 differ from each other.

20. The method of claim 17, wherein a thickness of the Faradaic layer is in a range of 100 to 1000 nm.

* * * * *